US012688820B2

(12) United States Patent
Xiao et al.

(10) Patent No.: US 12,688,820 B2
(45) **Date of Patent: *Jul. 21, 2026**

(54) DISPLAY SUBSTRATE AND DRIVING METHOD THEREOF, AND DISPLAY APPARATUS

(71) Applicant: BOE TECHNOLOGY GROUP CO., LTD., Beijing (CN)

(72) Inventors: Li Xiao, Beijing (CN); Seungwoo Han, Beijing (CN); Dongni Liu, Beijing (CN); Haoliang Zheng, Beijing (CN); Minghua Xuan, Beijing (CN); Jiao Zhao, Beijing (CN); Liang Chen, Beijing (CN); Xiaorong Cui, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/980,404

(22) Filed: Dec. 13, 2024

(65) Prior Publication Data

US 2025/0111827 A1 Apr. 3, 2025

Related U.S. Application Data

(63) Continuation of application No. 18/005,373, filed as application No. PCT/CN2021/132874 on Nov. 24, 2021, now Pat. No. 12,198,608.

(51) Int. Cl.
*G09G 3/32* (2016.01)

(52) U.S. Cl.
CPC ....... *G09G 3/32* (2013.01); *G09G 2300/0861* (2013.01); *G09G 2310/0251* (2013.01); *G09G 2310/0262* (2013.01); *G09G 2310/0297* (2013.01)

(58) Field of Classification Search
CPC ............. G09G 3/32; G09G 2300/0861; G09G 2310/0251; G09G 2310/0262;
(Continued)

(56) References Cited

U.S. PATENT DOCUMENTS

2006/0123293 A1* 6/2006 Kim ..................... G09G 3/3291 714/724
2019/0006335 A1* 1/2019 Lee ......................... H01L 23/60
(Continued)

FOREIGN PATENT DOCUMENTS

CN 109559667 A 4/2019
CN 109698225 A * 4/2019 ........... G09G 3/3225
(Continued)

OTHER PUBLICATIONS

Korean Office Action (w/English translation) for corresponding Application No. 10-2023-7045124, dated Apr. 25, 2025, 15 pages.
(Continued)

*Primary Examiner* — Koosha Sharifi-Tafreshi
(74) *Attorney, Agent, or Firm* — Dority & Manning, P.A.

(57) ABSTRACT

A display substrate includes a plurality of data lines extending in a first direction, and a plurality of sub-pixels. A sub-pixel includes a pixel driving circuit and a light-emitting device. The pixel driving circuit includes a current control circuit, and a duration control circuit electrically connected to the current control circuit and the light-emitting device. The current control circuit is configured to generate a driving signal to drive the light-emitting device to emit light; and the duration control circuit is configured to generate a duration control signal to control a duration of a connection between the current control circuit and the light-emitting device. The current control circuit and the duration control circuit are electrically connected to a same data line.

19 Claims, 17 Drawing Sheets

(58) Field of Classification Search
CPC ......... G09G 2310/0297; G09G 3/2081; G09G 3/3291; G09G 3/3233
See application file for complete search history.

(56) References Cited

U.S. PATENT DOCUMENTS

| | | | | |
|---|---|---|---|---|
| 2019/0122609 | A1 | 4/2019 | Liu et al. | |
| 2019/0355305 | A1 | 11/2019 | Yang et al. | |
| 2021/0027699 | A1 * | 1/2021 | Zheng | G09G 3/32 |
| 2021/0201760 | A1 * | 7/2021 | Wang | G09G 3/3233 |
| 2021/0201787 | A1 * | 7/2021 | Yuan | G09G 3/3291 |

FOREIGN PATENT DOCUMENTS

| | | | | | |
|---|---|---|---|---|---|
| CN | 109872680 | A | * | 6/2019 | G09G 3/3233 |
| CN | 110010057 | A | * | 7/2019 | G09G 3/32 |
| CN | 110310594 | A | * | 10/2019 | G09G 3/32 |
| CN | 111223444 | A | | 6/2020 | |
| CN | 113053299 | A | | 6/2021 | |
| JP | H11271811 | A | | 10/1999 | |
| JP | 2020013108 | A | | 1/2020 | |
| KR | 20060031548 | A | | 4/2006 | |

OTHER PUBLICATIONS

Chinese Office Action (w/English translation) for corresponding Application No. 202180003550.7, dated Nov. 26, 2025, 28 pages.
Indian Office Action for corresponding Application No. 202317087661, mailed Dec. 2, 2025, 5 pages.
Japanese Office Action (w/English translation) for corresponding Application No. 2023-579655, dated Nov. 4, 2025, 10 pages.

* cited by examiner

DISPLAY SUBSTRATE AND DRIVING METHOD THEREOF, AND DISPLAY APPARATUS

CROSS-REFERENCE TO RELATED APPLICATIONS

This application is a continuation of U.S. patent application Ser. No. 18/005,373, filed on Jan. 13, 2023, which claims priority to International Patent Application No. PCT/CN2021/132874 filed on Nov. 24, 2021, which are incorporated herein by reference in their entirety.

TECHNICAL FIELD

The present disclosure relates to the field of display technologies, and in particular, to a display substrate and a driving method thereof, and a display apparatus.

BACKGROUND

The display market is currently booming, and with continuous improvement of requirements of consumers on a wide variety of display products such as laptops, smartphones, televisions (TVs), tablet computers, smart watches and fitness wristbands, more new display products will emerge in the future.

SUMMARY

In one aspect, a display substrate is provided. The display substrate includes a plurality of data lines extending in a first direction, and a plurality of sub-pixels. A sub-pixel includes a pixel driving circuit and a light-emitting device. Each sub-pixel includes a pixel driving circuit and a light-emitting device. The pixel driving circuit includes a current control circuit, and a duration control circuit electrically connected to the current control circuit and the light-emitting device. The current control circuit is configured to generate a driving signal to drive the light-emitting device to emit light. The duration control circuit is configured to generate a duration control signal to control a duration of a connection between the current control circuit and the light-emitting device. The current control circuit and the duration control circuit are electrically connected to a same data line.

In some embodiments, the plurality of sub-pixels are arranged in a plurality of columns in a second direction intersecting the first direction. The same data line is electrically connected to at least one column of sub-pixels.

In some embodiments, one or more columns of sub-pixels are disposed between any two adjacent data lines.

In some embodiments, the display substrate further includes: a multi-output selection circuit electrically connected to the plurality of data lines; a plurality of data transmission lines electrically connected to the multi-output selection circuit; a plurality of selection signal lines electrically connected to the multi-output selection circuit. The multi-output selection circuit is configured to, under control of selection signals transmitted by the plurality of selection signal lines, transmit data signals transmitted by the plurality of data transmission lines to the plurality of data lines in different periods.

In some embodiments, the plurality of data lines at least include a plurality of first data lines, a plurality of second data lines and a plurality of third data lines. The plurality of data transmission lines at least include a plurality of first data transmission lines, a plurality of second data transmission lines and a plurality of third data transmission lines. The multi-output selection circuit includes a plurality of selection transistor groups; and a selection transistor group is electrically connected to a selection signal line, a first data line, a second data line and a third data line. A first data transmission line is electrically connected to at least two selection transistor groups, and electrically connected to corresponding multiple first data lines through the at least two selection transistor groups. A second data transmission line is electrically connected to the at least two selection transistor groups, and electrically connected to corresponding multiple second data lines through the at least two selection transistor groups. A third data transmission line is electrically connected to the at least two selection transistor groups, and electrically connected to the corresponding multiple third data line through the at least two selection transistor groups.

In some embodiments, the plurality of first data transmission lines, the plurality of second data transmission lines and the plurality of third data transmission lines are arranged periodically; and/or the plurality of first data lines, the plurality of second data lines and the plurality of third data lines are arranged periodically.

In some embodiments, the selection transistor group at least includes a first selection transistor, a second selection transistor and a third selection transistor. A control electrode of the first selection transistor is electrically connected to the selection signal line, a first electrode of the first selection transistor is electrically connected to the first data transmission line, and a second electrode of the first selection transistor is electrically connected to the first data line. A control electrode of the second selection transistor is electrically connected to the selection signal line, a first electrode of the second selection transistor is electrically connected to the second data transmission line, and a second electrode of the second selection transistor is electrically connected to the second data line. A control electrode of the third selection transistor is electrically connected to the selection signal line, a first electrode of the third selection transistor is electrically connected to the third data transmission line, and a second electrode of the third selection transistor is electrically connected to the third data line.

In some embodiments, the same data line is electrically connected to a single column of sub-pixels.

In some embodiments, the same data line is electrically connected to at least two columns of sub-pixels. The display substrate further includes a plurality of gate lines extending in the second direction. A sub-pixel is electrically connected to a gate line. The plurality of sub-pixels are arranged in a plurality of rows in the first direction. A row of sub-pixels is electrically connected to at least two gate lines. The at least two gate lines are configured to transmit scanning signals to corresponding sub-pixels respectively, so as to control the row of sub-pixels to receive data signals transmitted by the plurality of data lines in different periods.

In some embodiments, a number of columns of the sub-pixels electrically connected to the same data line is equal to a number of gate lines electrically connected to a same row of sub-pixels.

In some embodiments, the at least two gate lines are disposed on opposite sides of the row of sub-pixels, respectively.

In some embodiments, in a same row of sub-pixels, any two adjacent sub-pixels are electrically connected to different gate lines, respectively.

In some embodiments, the display substrate further includes: a substrate, the plurality of data lines and the plurality of sub-pixels being disposed on one side of the substrate, and a plurality of connection wires disposed on an edge of the substrate. One end of a connection wire is electrically connected to at least one data line, and another end of the connection wire extends to another side of the substrate. In a case where the display substrate further includes a multi-output selection circuit and a plurality of data transmission lines, the one end of the connection wire is electrically connected to a data transmission line, and electrically connected to multiple data lines through the multi-output selection circuit.

In some embodiments, the current control circuit is at least electrically connected to a scanning signal terminal, a data signal terminal, a first enabling signal terminal, a first voltage signal terminal and a first node. The current control circuit is configured to generate the driving signal in response to a scanning signal received at the scanning signal terminal, a data signal received at the data signal terminal, a first enabling signal received at the first enabling signal terminal, and a first voltage signal received at the first voltage signal terminal. The duration control circuit is at least electrically connected to the data signal terminal, a first reset signal terminal, a second reset signal terminal, the first enabling signal terminal, a second enabling signal terminal, the first node and the light-emitting device. The duration control circuit is configured, in response to the data signal and a first reset signal received at the first reset signal terminal, to control a duration of a connection between the first node and the light-emitting device according to a second enabling signal received at the second enabling signal terminal; or in response to the data signal and the second reset signal received at the second reset signal terminal, to control a duration of a connection between the first node and the light-emitting device according to the first enabling signal. The current control circuit and the duration control circuit are electrically connected to the data line through the same data signal terminal.

In some embodiments, a period of an active level of the first reset signal is in non-coincidence with a period of an active level of the second reset signal. Of the data signal, one of a level corresponding to an active level of the first reset signal, and a level corresponding to an active level of the second reset signal is an active level.

In some embodiments, in a phase of generating the driving signal, a period in which a level of the data signal becomes an active level is earlier than a period in which a level of the scanning signal becomes an active level.

In some embodiments, the duration control circuit includes a first control sub-circuit, a second control sub-circuit and a third control sub-circuit. The first control sub-circuit is at least electrically connected to the data signal terminal, the first reset signal terminal, the second enabling signal terminal and a second node, and is configured to transmit the second enabling signal to the second node in response to the data signal and the first reset signal. The second control sub-circuit is at least electrically connected to the data signal terminal, the second reset signal terminal, the first enabling signal terminal and the second node, and is configured to transmit the first enabling signal to the second node in response to the data signal and the second reset signal. The third control sub-circuit is electrically connected to the first node, the second node and the light-emitting device, and is configured to control the duration of the connection between the first node and the light-emitting device under control of a signal from the second node.

In some embodiments, the first control sub-circuit includes a first transistor, a second transistor and a first capacitor. A control electrode of the first transistor is electrically connected to the first reset signal terminal, a first electrode of the first transistor is electrically connected to the data signal terminal, and a second electrode of the first transistor is electrically connected to a third node. A control electrode of the second transistor is electrically connected to the third node, a first electrode of the second transistor is electrically connected to the second enabling signal terminal, and a second electrode of the second transistor is electrically connected to the second node. A first electrode of the first capacitor is electrically connected to an initial signal terminal, and a second electrode of the first capacitor is electrically connected to the third node. The second control sub-circuit includes a third transistor, a fourth transistor and a second capacitor. A control electrode of the third transistor is electrically connected to the second reset signal terminal, a first electrode of the third transistor is electrically connected to the data signal terminal, and a second electrode of the third transistor is electrically connected to a fourth node. A control electrode of the fourth transistor is electrically connected to the fourth node, a first electrode of the fourth transistor is electrically connected to the first enabling signal terminal, and a second electrode of the fourth transistor is electrically connected to the second node. A first electrode of the second capacitor is electrically connected to the initial signal terminal, and a second electrode of the second capacitor is electrically connected to the fourth node. The third control sub-circuit includes a fifth transistor. A control electrode of the fifth transistor is electrically connected to the second node, a first electrode of the fifth transistor is electrically connected to the first node, and a second electrode of the fifth transistor is electrically connected to the light-emitting device.

In some embodiments, the current control circuit includes a data writing sub-circuit, a driving sub-circuit, a compensation sub-circuit and a light-emitting control sub-circuit. The data writing sub-circuit is electrically connected to the scanning signal terminal, the data signal terminal and a fifth node, and is configured to transmit the data signal to the fifth node under control of the scanning signal. The driving sub-circuit is at least electrically connected to the first node, the fifth node and a sixth node, and is configured to transmit a signal from the fifth node to the first node under control of a voltage of the sixth node. The compensation sub-circuit being electrically connected to the scanning signal terminal, the first node and the sixth node, and is configured to transmit a signal from the first node to the sixth node under the control of the scanning signal to compensate a threshold voltage of the driving sub-circuit. The light-emitting control sub-circuit is electrically connected to the first enabling signal terminal, the first voltage signal terminal, and the fifth node, and is configured to transmit the first voltage signal to the fifth node under control of the first enabling signal.

In some embodiments, the data writing sub-circuit includes a sixth transistor. A control electrode of the sixth transistor is electrically connected to the scanning signal terminal, a first electrode of the sixth transistor is electrically connected to the data signal terminal, and a second electrode of the sixth transistor is electrically connected to the fifth node. The driving sub-circuit includes a seventh transistor and a third capacitor. A control electrode of the seventh transistor is electrically connected to the sixth node, a first electrode of the seventh transistor is electrically connected to the fifth node, and a second electrode of the seventh transistor is electrically connected to the first node. A first electrode of the third capacitor is electrically connected to the sixth node, and a second electrode of the third capacitor is electrically connected to the first voltage signal terminal. The compensation sub-circuit includes an eighth transistor. A control electrode of the eighth transistor is electrically connected to the scanning signal terminal, a first electrode of the eighth transistor is electrically connected to the first node, and a second electrode of the eighth transistor is electrically connected to the sixth node. The light-emitting control sub-circuit includes a ninth transistor. A control electrode of the ninth transistor is electrically connected to the first enabling signal terminal, a first electrode of the ninth transistor is electrically connected to the first voltage signal terminal, and a second electrode of the ninth transistor is electrically connected to the fifth node.

In some embodiments, the current control circuit further includes a reset sub-circuit. The reset sub-circuit is electrically connected to the first reset signal terminal, an initial signal terminal, the sixth node and the light-emitting device. The reset sub-circuit is configured to transmit an initial signal received at the initial signal terminal to the sixth node and the light-emitting device in response to the first reset signal.

In some embodiments, the reset sub-circuit includes a tenth transistor and an eleventh transistor. A control electrode of the tenth transistor is electrically connected to the first reset signal terminal, a first electrode of the tenth transistor is electrically connected to the initial signal terminal, and a second electrode of the tenth transistor is electrically connected to the sixth node. A control electrode of the eleventh transistor is electrically connected to the first reset signal terminal, a first electrode of the eleventh transistor is electrically connected to the initial signal terminal, and a second electrode of the eleventh transistor is electrically connected to the light-emitting device.

In another aspect, a driving method of a display substrate is provided. The driving method is used for driving the display substrate in any of the above embodiments. The driving method includes: transmitting data signals to the plurality of data lines of the display substrate, and receiving, by a current control circuit and a duration control circuit in a same sub-pixel, a data signal.

In some embodiments, the current control circuit includes a data writing sub-circuit, a driving sub-circuit, a compensation sub-circuit and a light-emitting control sub-circuit; and the duration control circuit includes a first control sub-circuit, a second control sub-circuit and a third control sub-circuit. A display phase of a frame includes: a first phase, a second phase, a third phase and a fourth phase. In a case where a gray scale to be displayed by the sub-pixel of the display substrate is greater than or equal to a threshold gray scale, in the first phase, the first control sub-circuit is turned off in response to a first reset signal received at a first reset signal terminal and the data signal; in the second phase, the second control sub-circuit is turned on in response to a second reset signal received at a second reset signal terminal and the data signal, and a first enabling signal received at a first enabling signal terminal is transmitted to a second node. In a case where the gray scale to be displayed by the sub-pixel of the display substrate is less than the threshold gray scale, in the first phase, the first control sub-circuit is turned on in response to the first reset signal and the data signal, and the first control sub-circuit transmits a second enabling signal received at a second enabling signal terminal to the second node; in the second phase, the second control sub-circuit is turned off in response to the second reset signal and the data signal. In the third phase, the data writing sub-circuit and the compensation sub-circuit is turned on in response to a scanning signal received at a scanning signal terminal, and the data writing sub-circuit transmits the data signal to a sixth node through a fifth node, the driving sub-circuit, a first node and the compensation sub-circuit in sequence to compensate a threshold voltage of the driving sub-circuit. In the fourth phase, the light-emitting control sub-circuit is turned on in response to the first enabling signal, and transmits a first voltage signal received at the first voltage signal terminal to the first node through the fifth node and the driving sub-circuit in sequence.

In some embodiments, the data line is configured to store the data signal. The scanning signal terminal is configured to transmit the scanning signal after the data line stores the data signal in the third phase, so as to control the data writing sub-circuit and the compensation sub-circuit to be turned on.

In yet another aspect, a display apparatus is provided. The display apparatus includes at least one display substrate each as described in any of the above embodiments.

In some embodiments, the display substrate includes: a substrate and a plurality of connection wires disposed on an edge of the substrate. Ends of the plurality of connection wires are located at one side of the substrate, and opposite ends of the plurality of connection wires extend to another side of the substrate. The display apparatus further includes a driving chip disposed on the another side of the substrate; and the driving chip is electrically connected to the opposite ends of the plurality of connection wires.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these accompanying drawings. In addition, the accompanying drawings in the following description may be regarded as schematic diagrams, and are not limitations on actual sizes of products, actual processes of methods and actual timings of signals involved in the embodiments of the present disclosure.

DETAILED DESCRIPTION

Figure 1:
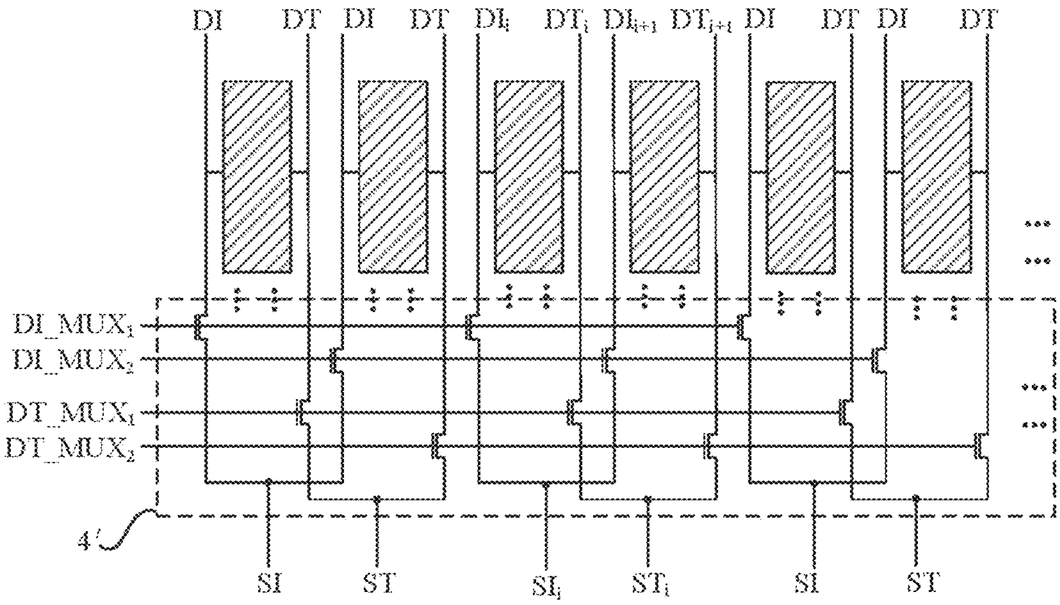
FIG. 1 is a structural diagram of a display substrate, in accordance with an implementation.

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed in an open and inclusive sense, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, but are not to be construed as indicating or implying the relative importance or implicitly indicating the number of indicated technical features. Thus, a feature defined with "first" or "second" may explicitly or implicitly include one or more of the features. In the description of the embodiments of the present disclosure, unless otherwise specified, the term "a plurality of/the plurality of" means two or more.

In the description of some embodiments, the term "connected" and derivatives thereof may be used. For example, the term "connected" may be used in the description of some embodiments to indicate that two or more components are in direct physical or electrical contact with each other. The embodiments disclosed herein are not necessarily limited to the content herein.

The phrase "at least one of A, B and C" has the same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if" is, optionally, construed to mean "when" or "upon" or "in response to determining" or "in response to detecting", depending on the context. Similarly, depending on the context, the phrase "if it is determined" or "if [a stated condition or event] is detected" is optionally construed as "in a case where it is determined", "in response to determining", "in a case where [the stated condition or event] is detected", or "in response to detecting [the stated condition or event]".

The use of "suitable for" or "configured to" herein means an open and inclusive expression, which does not exclude devices that are applicable to or configured to perform additional tasks or steps.

Additionally, the use of the phase "based on" is meant to be open and inclusive, since a process, step, calculation or other action that is "based on" one or more of the stated conditions or values may, in practice, be based on additional conditions or value beyond those stated.

As used herein, the term "about" or "approximately" includes a stated value and an average value within an acceptable deviation range of a specific value. The acceptable deviation range is determined by a person of ordinary skill in the art in view of the measurement in question and the error associated with the measurement of a particular quantity (i.e., limitations of the measurement system).

Exemplary embodiments are described herein with reference to sectional views and/or plan views as idealized exemplary drawings. In the accompanying drawings, thickness of layers and areas of regions are enlarged for clarity. Variations in shapes with respect to the accompanying drawings due to, for example, manufacturing technologies and/or tolerances may be envisaged. Therefore, the exemplary embodiments should not be construed as being limited to the shapes of the regions shown herein, but including deviations in the shapes due to, for example, manufacturing. For example, an etched region shown in a rectangular shape generally has a curved feature. Therefore, the regions shown in the accompanying drawings are schematic in nature, and their shapes are not intended to show actual shapes of regions in a device, and are not intended to limit the scope of the exemplary embodiments.

Transistors used in circuits provided by embodiments of the present disclosure may be field effect transistors (e.g., thin film transistors), or other switching devices with same characteristics. The embodiments of the present disclosure will be described by taking an example in which the transistors are the thin film transistors.

In some embodiments, for each transistor used in circuits, a control electrode is a gate of the transistor, a first electrode is one of a source and a drain of the transistor, and a second electrode is the other one of the source and the drain of the transistor. Since a source and a drain of a transistor may be symmetrical in structure, the source and the drain thereof may be indistinguishable in structure. That is, the first electrode and the second electrode of the transistor in embodiments of the present disclosure may be indistinguishable in structure. For example, in a case where the transistor is a P-type transistor, the first electrode of the transistor is the source, and the second electrode of the transistor is the drain. For example, in a case where the transistor is an N-type transistor, the first electrode of the transistor is the drain, and the second electrode of the transistor is the source.

In the circuits provided by the embodiments of the present disclosure, "nodes" do not represent real components, but rather represent junctions of related electrical connections in a circuit diagram. That is, these nodes are nodes equivalent to the junctions of the related electrical connections in the circuit diagram.

Transistors included in the circuits provided by the embodiments of the present disclosure may be all N-type transistors or P-type transistors. Alternatively, some of the transistors included in the circuits may be N-type transistors, and some other of the transistors may be P-type transistors.

In embodiments of the present disclosure, "active level" refers to a level at which the transistor can be turned on.

Hereinafter, a description will be given by taking an example in which the transistors in the circuits provided by the embodiments of the present disclosure are all the P-type transistors (in this case, the active level is a low level). It will be noted that the transistors in the circuits mentioned below being of a same turn-on type may simplify a process flow, reduce process difficulty, and improve yields of products (e.g., a display substrate 100 and a display apparatus 1000).

Some embodiments of the present disclosure provide a display substrate 100 and a driving method of the display substrate, and a display apparatus 1000, which will be described below, respectively.

Figure 21:
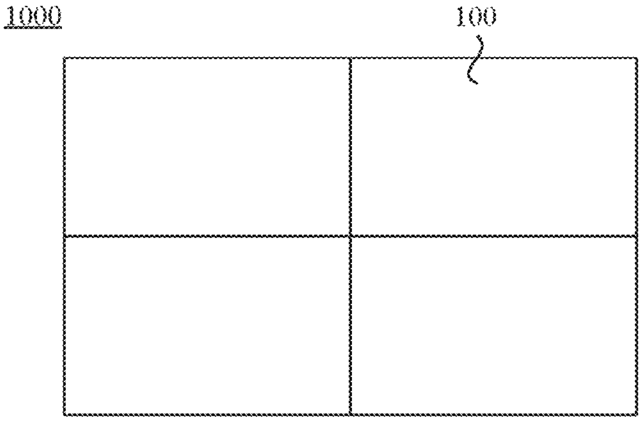
FIG. 21 is a structural diagram of a display apparatus, in accordance with some embodiments of the present disclosure.
Figure 22:
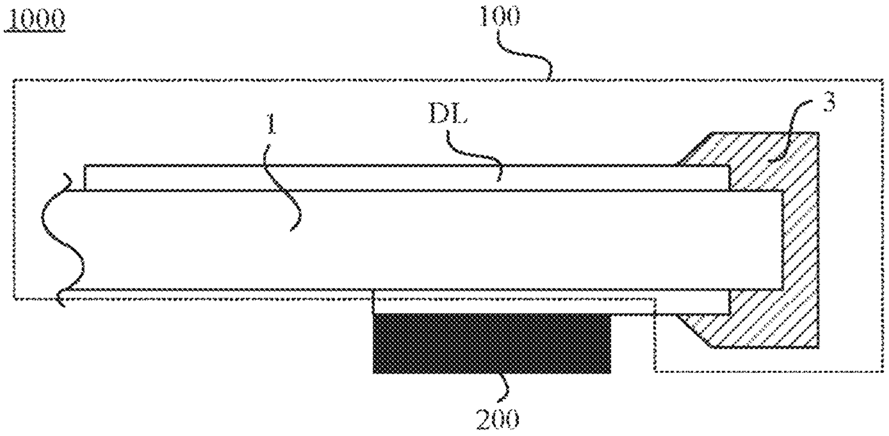
FIG. 22 is a structural diagram of another display apparatus, in accordance with some embodiments of the present disclosure.

Some embodiments of the present disclosure provide the display apparatus 1000, as shown in FIGS. 21 and 22. The display apparatus 1000 may be any device that can display images whether in motion (e.g., a video) or stationary (e.g., a static image), and whether textual or graphical. More specifically, it is expected that the described embodiments may be implemented in or associated with a variety of electronic devices. The variety of electronic devices may include (but are not limit to), for example, mobile telephones, wireless devices, personal digital assistants (PDA), hand-held or portable computers, global positioning system (GPS) receivers/navigators, cameras, MPEG-4 Part 14 (MP4) video players, video cameras, game consoles, watches, clocks, calculators, television (TV) monitors, flat-panel displays, computer monitors, car displays (e.g., odometer displays), navigators, cockpit controllers and/or displays, camera view displays (e.g., display of rear view camera in vehicles), electronic photos, electronic billboards or signs, projectors, architectural structures, packaging and aesthetic structures (e.g., a display for an image of a piece of jewelry).

In some embodiments, as shown in FIG. 21, the display apparatus 1000 may include at least one display substrate 100. That is, the display apparatus 1000 may include a single display substrate 100, or a plurality of display substrates 100.

As shown in FIG. 21, in a case where the display apparatus 1000 includes the plurality of display substrates 100, the plurality of display substrates 100 may be tiled with each other, so that the display apparatus 1000 has a large screen size. In this case, the display substrate 100 may be referred to as a tiling display substrate, and the display apparatus 1000 may be referred to as a tiled display apparatus.

Of course, as shown in FIG. 22, the display apparatus 1000 may further include, for example, a driving chip 200 and other electronic accessories.

For example, the driving chip 200 may include, but is not limited to, a source driving circuit for providing a data signal, a power circuit for providing a first voltage signal, or the like.

Figure 5:
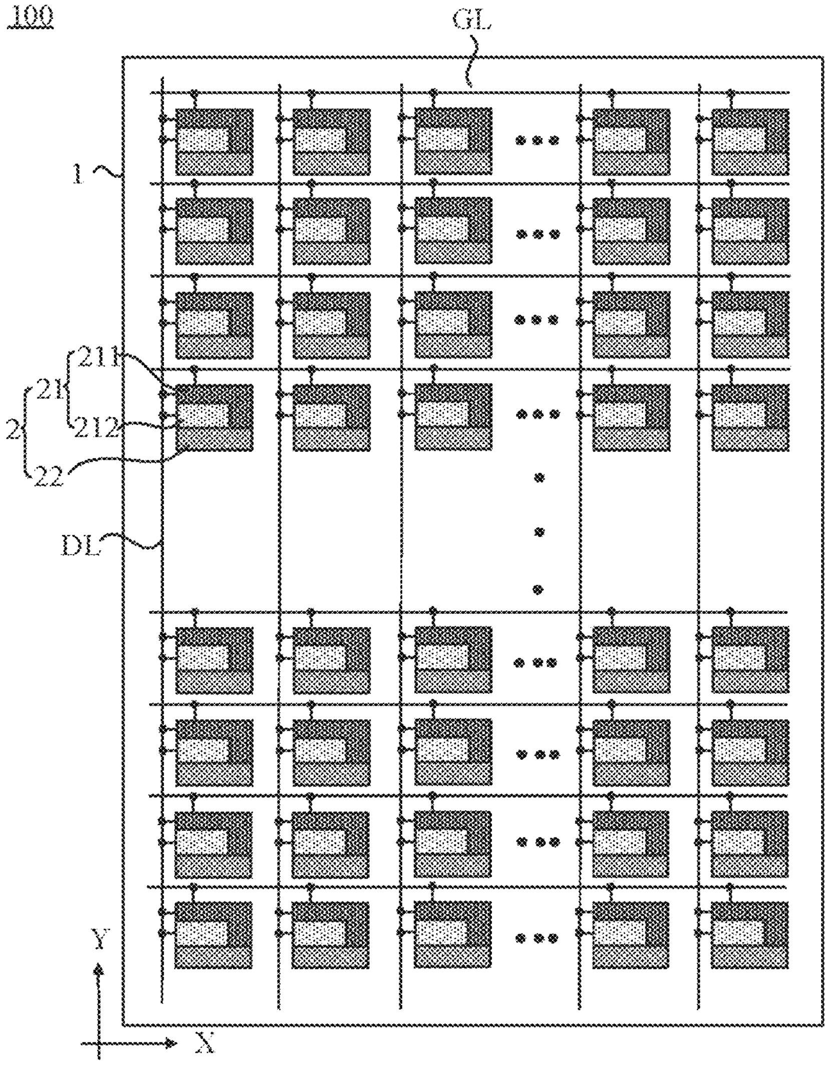
FIG. 5 is a structural diagram of a display substrate, in accordance with some embodiments of the present disclosure.

In some embodiments, as shown in FIG. 5, the display substrate 100 includes a substrate 1, a plurality of sub-pixels 2, a plurality of data lines DL, and a plurality of gate lines GL.

A type of the substrate 1 varies, and may be set depending on actual needs.

For example, the substrate 1 may be a rigid substrate. A material of the rigid substrate may include, for example, glass, quartz, or plastic.

For example, the substrate 1 may be a flexible substrate. A material of the flexible substrate may include, for example, polyethylene terephthalate (PET), polyethylene naphthalate (PEN), or polyimide (PI).

In some examples, the plurality of sub-pixels 2, the plurality of data lines DL and the plurality of gate lines GL are all disposed on one side of the substrate 1. The plurality of data lines DL may extend in a first direction Y, and the plurality of gate lines GL may extend in a second direction X. Each sub-pixel 2 is electrically connected to a single data line DL and a single gate line GL.

In some examples, as shown in FIG. 5, the plurality of sub-pixels 2 are arranged in a plurality of columns in the second direction X and in a plurality of rows in the first direction X. For any two adjacent columns of sub-pixels, each column may include the same number of sub-pixels 2 or a different number of sub-pixels 2; and for any two adjacent rows of sub-pixels, each row may include the same number of sub-pixels 2 or a different number of sub-pixels 2.

Herein, the first direction Y and the second direction X intersect with each other. An included angle between the first direction Y and the second direction X may be set depending on actual needs. For example, the included angle between the first direction Y and the second direction X may be 85°, 88°, 90°, 92° or 95°.

For example, the plurality of sub-pixels 2 may include sub-pixels in a plurality of colors. For example, the plurality of sub-pixels 2 may include red sub-pixels, green sub-pixels and blue sub-pixels. Of course, the plurality of sub-pixels 2 may further include, for example, white sub-pixels. In a case where sub-pixels 2 in a pixel unit include a red sub-pixel, a green sub-pixel and a blue sub-pixel, the three sub-pixels may be arranged horizontally, vertically, or in a shape like the Chinese character "pin (品)". In a case where sub-pixels 2 in a pixel unit include a red sub-pixel, a green sub-pixel, a blue sub-pixel, and a white sub-pixel, the four sub-pixels may be arranged horizontally, vertically, in an array, or the like. Embodiments of the present disclosure do not limit this herein.

Figure 6:
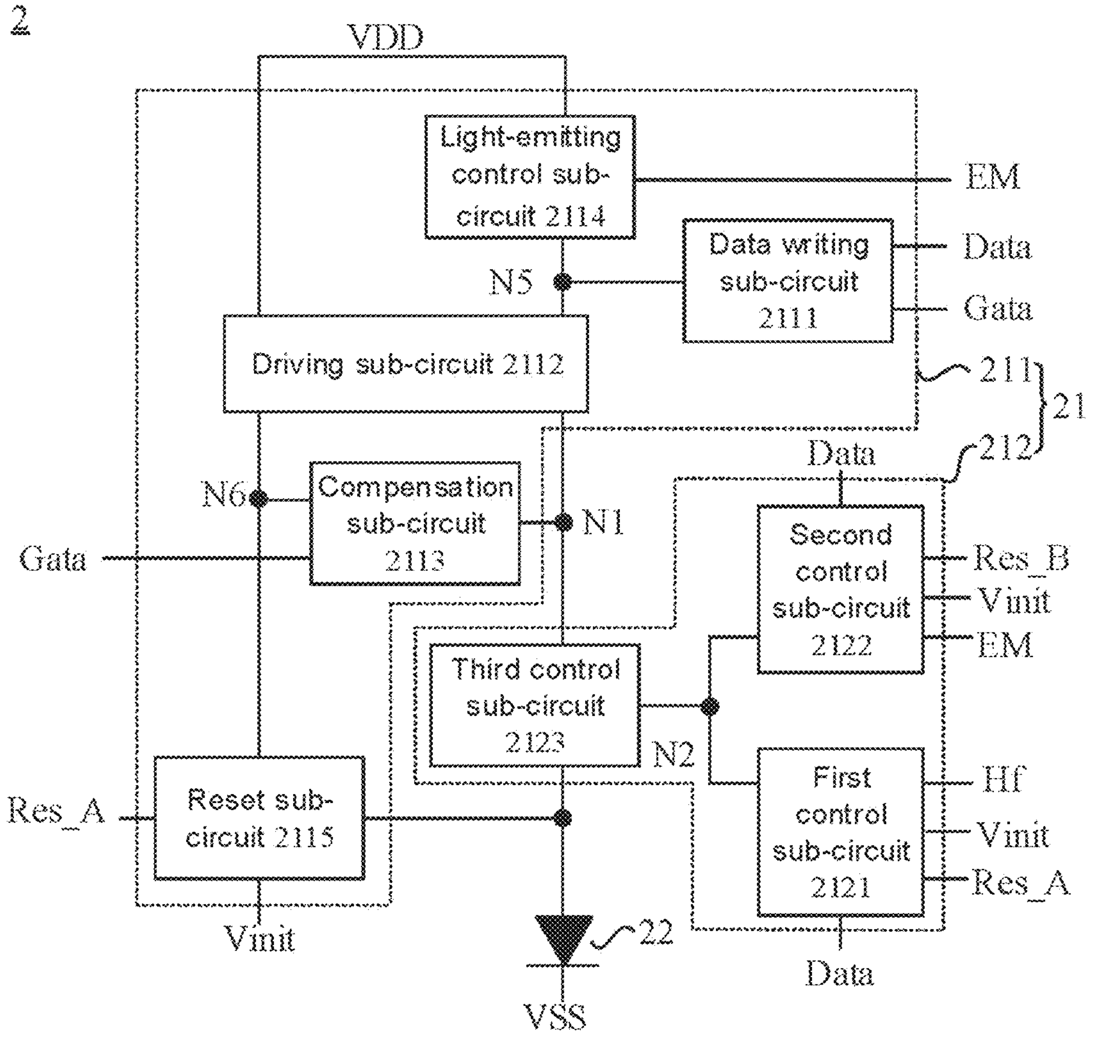
FIG. 6 is a structural diagram of a sub-pixel, in accordance with some embodiments of the present disclosure.

In some examples, as shown in FIGS. 5 and 6, in the plurality of sub-pixels 2, each sub-pixel 2 may include a pixel driving circuit 21 and a light-emitting device 22 electrically connected to the pixel driving circuit 21. The pixel driving circuit 21 may provide a driving signal for the light-emitting device 22 to drive the light-emitting device 22 to emit light.

Herein, depending on the colors of the sub-pixels, the light-emitting devices 22 may emit light of corresponding different colors.

For example, a light-emitting device 22 in the red sub-pixel may emit red light, a light-emitting device 22 in the green sub-pixel may emit green light, a light-emitting device 22 in the blue sub-pixel may emit blue light, and a light-emitting device 22 in the white sub-pixel may emit white light.

For another example, the light-emitting devices 22 in the red sub-pixel, the green sub-pixel, the blue sub-pixel and the white sub-pixel may all emit the blue light. In this case, the red sub-pixel, the green sub-pixel and the white sub-pixel may respectively convert the blue light into the red light, the green light and the white light through corresponding color conversion materials (such as quantum dot materials, or fluorescent powder materials). In this way, red light, green light, blue light and white light may be emitted.

That is, the above arrangement of the sub-pixels 2 may refer to an arrangement of the light-emitting devices 22.

For example, the light-emitting device 22 is a current-driven type element. The light-emitting device 22 may be of various types, which may be set depending on actual needs.

For example, the light-emitting device 22 may be a light-emitting diode (LED) such as a micro light-emitting diode (Micro LED), or a mini light-emitting diode (Mini LED).

It will be noted that, when the light-emitting device 22 emits light, luminance of the light-emitting device 22 is related to a current amplitude of the received driving signal (i.e., a current signal) and a duration of the received driving signal.

For example, in a case where the duration of the driving signal received by the light-emitting device 22 is a fixed value, the greater the current amplitude of the driving signal, the greater the luminance of the light-emitting device 22, and the smaller the current amplitude of the driving signal, the smaller the luminance of the light-emitting device 22. In a case where the current amplitude of the driving signal received by the light-emitting device 22 is a fixed value, the longer the duration of the driving signal received by the light-emitting device 22, the greater the luminance of the light-emitting device 22, and the shorter the duration of the driving signal received by the light-emitting device 22, the smaller the luminance of the light-emitting device 22.

However, when driven by the driving signal with a low current density (that is, the current amplitude of the driving signal is small), the light-emitting device 22 is prone to color coordinate shift and low external quantum efficiency, causing a phenomenon that luminance uniformity of the display substrate 100 is poor. That is, it is difficult to accurately display low gray scales only by controlling the current amplitude of the driving signal. Therefore, on the basis of controlling the current amplitude of the driving signal, the duration of the driving signal provided for the light-emitting device 22 may be controlled to accurately display the low gray scales.

In some examples, as shown in FIGS. 5 and 6, the pixel driving circuit 21 includes: a current control circuit 211, and a duration control circuit 212 electrically connected to the current control circuit 211 and the light-emitting device 22. The current control circuit 211 is configured to generate a driving signal to drive the light-emitting device 22 to emit light. The duration control circuit 212 is configured to generate a duration control signal to control a duration of a connection between the current control circuit 211 and the light-emitting device 22.

For example, the current control circuit 211 is capable of generating the driving signal, and the light-emitting device 22 can emit light under action of the driving signal. The current amplitude of the driving signal is variable, and correspondingly, the luminance of the light emitted by the light-emitting device 22 is also variable. By adjusting the current amplitude of the driving signal generated by the current control circuit 211, it is possible to make the light-emitting device 22 display different gray scales.

For example, the duration control circuit 212 is disposed between the current control circuit 211 and the light-emitting device 22. The duration control circuit 212 can control whether the current control circuit 211 and the light-emitting device 22 are connected to each other. That is, in a case where the duration control circuit 212 does not generate the duration control signal, the current control circuit 211 and the light-emitting device 22 are disconnected, i.e., not connected. Even if the current control circuit 211 generates the driving signal, it is difficult to transmit the driving signal to the light-emitting device 22.

In addition, the duration control signal generated by the duration control circuit 212 can control the duration of the connection between the current control circuit 211 and the light-emitting device 22. That is, in a case where a level of the duration control signal is an active level, the current control circuit 211 and the light-emitting device 22 may be electrically connected to each other to form a path. In a case where the level of the duration control signal is an inactive level, the current control circuit 211 and the light-emitting device 22 are disconnected. Herein, a duty ratio of the duration control signal is variable. That is, the duration during which the level of the duration control signal is the active level is variable. By adjusting the duty ratio of the duration control signal, it is possible to adjust the duration of the connection between the current control circuit 211 and the light-emitting device 22, and then to adjust luminance duration of the light-emitting device 22, so that the light-emitting device 22 displays different gray scales.

That is, in the present disclosure, on the basis of the driving signal with the high current amplitude generated by the current control circuit 211, the duration control signal generated by the duration control circuit 212 can control the duration of the driving signal transmitted to the light-emitting device 22, so as to control the luminance of the light-emitting device 22. In this way, it is beneficial to improve luminance uniformity of the display substrate 100, and improve display effect of the display substrate 100.

Herein, a range of the high current amplitude of the driving signal may be within a range where the light-emitting device 22 operates with high and stable luminous efficiency, good uniformity of color coordinate, and stable dominant wavelength of the emitted light. Therefore, regardless of whether the gray scale displayed by the light-emitting device 22 is a high gray scale or a low gray scale, the range of the current amplitude of the driving signal may be the same.

In an implementation manner, as shown in FIG. 1, there are two types of data signal terminals electrically connected to the pixel driving circuit in the sub-pixel, i.e., a current data signal terminal electrically connected to the current control circuit, and a duration data signal terminal electrically connected the duration control circuit. The current control circuit can control the current amplitude of the driving signal according to a current data signal transmitted by the current data signal terminal, and the duration control circuit can determine the duty ratio of the duration control signal according to a duration data signal transmitted by the duration data signal terminal. Correspondingly, the data lines included in the display substrate may include: current data lines DI electrically connected to current data signal terminals, and duration data lines DT electrically connected to duration data signal terminals, in which an i-th current data line $DI_i$ and an i-th duration data line $DT_i$ are disposed on opposite two sides of an i-th column of sub-pixels, respectively. Two data lines are disposed between the i-th column of sub-pixels and an (i+1)-th column of sub-pixels. The two data lines may be, for example, the i-th duration data line $DT_i$ and an (i+1)-th current data line $DI_{i+1}$, or the i-th current data line $DI_i$ and an (i+1)-th duration data line $DT_{i+1}$, where n and i are positive integers.

For example, the i-th duration data line $DT_i$ and the (i+1)-th current data line $DI_{i+1}$ are disposed between the i-th column of sub-pixels and the (i+1)-th column of sub-pixels. The inventors of the present disclosure have found that, after a current data signal required by a certain sub-pixel in the (i+1)-th column of sub-pixels is written to the (i+1)-th current data line $DI_{i+1}$, the (i+1)-th current data line $DI_{i+1}$ is in a floating state. A level of a duration data signal written to the i-th duration data line $DT_i$ may change in this process. In this case, the current data signal of the (i+1)-th current data line $DI_{i+1}$ changes due to the change in the level of the duration data signal, which will cause a driving signal generated by a current control circuit of the certain sub-pixel in the (i+1)-th column of sub-pixels to change. As a result, the luminance displayed by the certain sub-pixel in the (i+1)-th column of sub-pixels changes, and a poor phenomenon of a luminance difference in a column direction occurs.

For example, the level of the duration data signal written to the i-th duration data line $DT_i$ may change from a high level to a low level. Correspondingly, the level of the current data signal of the (i+1)-th current data line $DI_{i+1}$ is pulled down, resulting in an increase in a current amplitude of the driving signal generated by the current control circuit of the certain sub-pixel in the (i+1)-th column of sub-pixels. As a result, the luminance displayed by the certain sub-pixel in the (i+1)-th column of sub-pixels increase, and the poor phenomenon of the luminance difference in the column direction occurs.

In light of this, as shown in FIG. 5, in the sub-pixel 2 provided by the present disclosure, the current control circuit 211 and the duration control circuit 212 are electrically connected to a same data line DL. The current control circuit 211 and the duration control circuit 212 that are electrically connected to the same data line DL belong to the pixel driving circuit 21 of the same sub-pixel 2.

That is, in the present disclosure, a same sub-pixel 2 is electrically connected to a single data line DL, and a data signal transmitted by the single data line DL may be transmitted to the current control circuit 211 and the duration control circuit 212.

For example, since the current control circuit 211 and the duration control circuit 212 in the same sub-pixel 2 receive the same data signal, an active level of the data signal is written to the current control circuit 211 and the duration control circuit 212 in different periods in the present disclosure.

For example, the active level of the data signal written to the current control circuit 211 may be referred to as a first active level, and the active level of the data signal written to the duration control circuit 212 may be referred to as a second active level. In a display phase of a frame, the data signal with the second active level may be first written to the duration control circuit 212, so that the duration control circuit 212 generates the duration control signal (the duty ratio of the duration control signal is determined depending on the gray scale that needs to be displayed by the sub-pixel 2); and the data signal with the first active level may be then written to the current control circuit 211, so that the current control circuit 211 generates the driving signal (the current amplitude of the driving signal is determined depending on the gray scale that needs to be displayed by the sub-pixel 2).

In the present disclosure, the same sub-pixel 2 is electrically connected to the single data line DL, and the active level of the data signal is written to the current control circuit 211 and the duration control circuit 212 in the different periods. In this way, a writing and compensation phase corresponding to the current control circuit 211 is separated from a phase of generating the duration control signal corresponding to the duration control circuit 212, i.e., the two phases are non-coincident, and the level of the data signal is substantially unchanged in each phase. Signal crosstalk between two adjacent data lines DL may be effectively avoided, and a situation that the level of the data signal written to the current control circuit 211 changes due to the change in the level of the data signal written to the duration control circuit 212 may be avoided. As a result, it is beneficial to improve the poor phenomenon of the luminance difference in the column direction.

Therefore, in the display substrate 100 provided by some embodiments of the present disclosure, the current control circuit 211 and the duration control circuit 212 included in the pixel driving circuit 21 of the same sub-pixel 2 are electrically connected to the same data line DL, so that the active level of the data signal may be written to the current control circuit 211 and the duration control circuit 212 in the different periods. In this way, the phase in which the current control circuit 211 generates the driving signal is in non-coincidence with the phase in which the duration control circuit 212 generates the duration control signal. It is beneficial to ensure stability of the data signal in each phase, avoid the signal crosstalk between the two adjacent data lines DL, and then avoid the situation that the level of the data signal written to the current control circuit 211 changes due to the change in the level of the data signal written to the duration control circuit 212. As a result, it is beneficial to improve the poor phenomenon of the luminance difference in the column direction, and improve display effect of the display substrate 100.

In addition, since the same sub-pixel 2 is electrically connected to the single data line DL, the number of the data lines DL may be effectively reduced. A space occupied by the data lines DL may be reduced, and a wiring space of the display substrate 100 may be increased.

Figure 7:
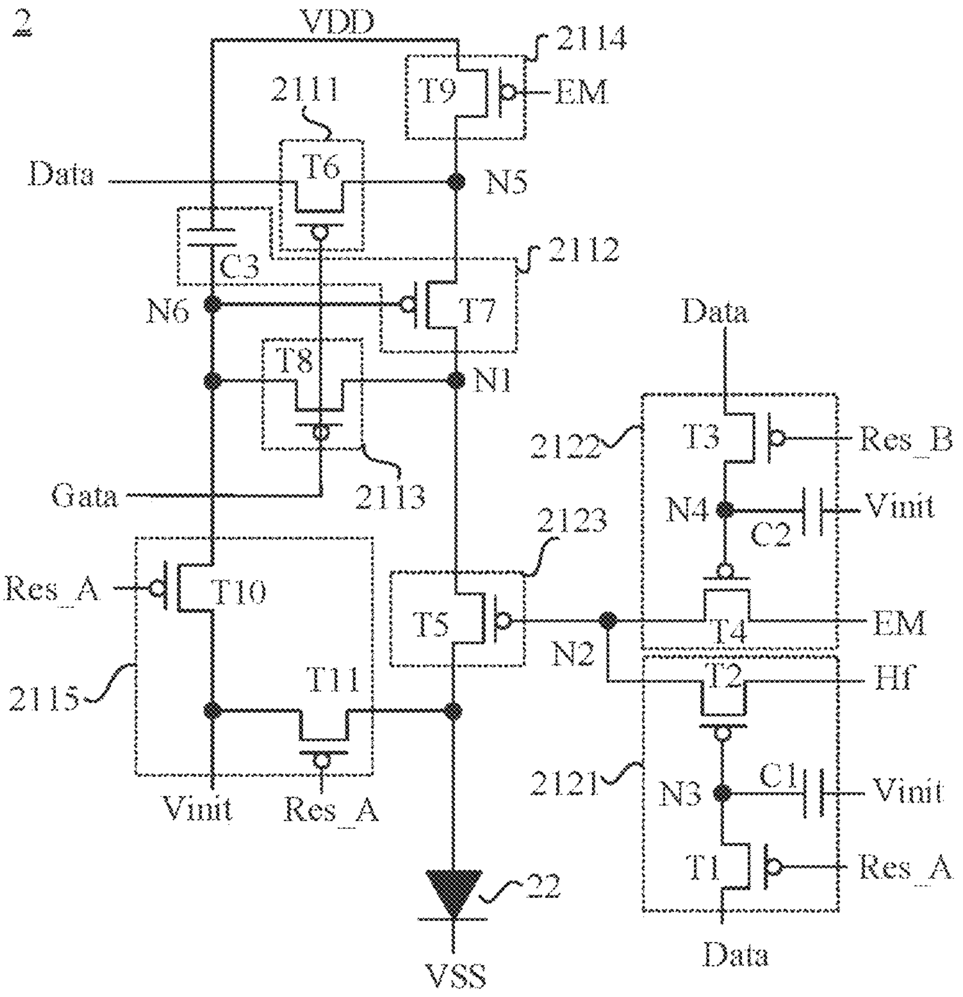
FIG. 7 is a circuit diagram of a sub-pixel, in accordance with some embodiments of the present disclosure.

It will be noted that there are various structures of the current control circuit 211 and the duration control circuit 212 in the sub-pixel 2. In embodiments of the present disclosure, the structures shown in FIGS. 6 and 7 are illustrative. Of course, the structures of the current control circuit 211 and the duration control circuit 212 are not limited to the structures exemplified in embodiments of the present disclosure.

In some embodiments, as shown in FIGS. 6 and 7, the current control circuit 211 is at least electrically connected to a scanning signal terminal Gate, a data signal terminal Data, a first enabling signal terminal EM, a first voltage signal terminal VDD and a first node N1. The current control circuit 211 is configured to generate the driving signal in response to a scanning signal received at the scanning signal terminal Gate, a data signal received at the data signal terminal Data, a first enabling signal received at the first enabling signal terminal EM and a first voltage signal received at the first voltage signal terminal VDD. The duration control circuit 212 is at least electrically connected to the data signal terminal Data, a first reset signal terminal Res_A, a second reset signal terminal Res_B, the first enabling signal terminal EM, a second enabling signal terminal Hf, the first node N1 and the light-emitting device 22. The duration control circuit 212 is configured to, in response to the data signal and a first reset signal received at the first reset signal terminal Res_A, control a duration of a connection between the first node N1 and the light-emitting device 22 according to a second enabling signal received at the second enabling signal terminal Hf; or in response to the data signal and a second reset signal received at the second reset signal terminal Res_B, control the duration of the connection between the first node N1 and the light-emitting device 22 according to the first enabling signal. That is, the duration control signal is the first enabling signal or the second enabling signal.

In some examples, as shown in FIGS. 6 and 7, an anode of the light-emitting device 22 is electrically connected to the first node N1, and a cathode of the light-emitting device 22 is electrically connected to a second voltage signal terminal VSS.

In some examples, the first voltage signal terminal VDD is configured to transmit a direct current high level signal. Herein, the direct current high level signal is referred to as the first voltage signal. The second voltage signal terminal VSS is configured to transmit a direct current low level signal. Herein, the direct current low level signal is referred to as a second voltage signal. The "high level" and the "low level" herein are relative terms, and therefore do not limit a magnitude of a voltage value thereof.

In some examples, the second enabling signal transmitted by the second enabling signal terminal Hf is a high frequency pulse signal. For example, the second enabling signal includes a plurality of pulses in a display phase of a frame. For example, a frequency of the second enabling signal is greater than a frequency of the first enabling signal. For example, in unit time, the duration of the active level of the second enabling signal occurs more times than the duration of the active level of the first enabling signal.

For example, in a process of transmitting the second enabling signal, the second enabling signal may be simultaneously transmitted to the plurality of sub-pixels 2 included in the display substrate 100. For example, the frequency of the second enabling signal may be determined depending on the number of rows of sub-pixels included in the display substrate 100. For example, a frame frequency of the display substrate 100 is 60 Hz. That is, the display substrate 100 can display 60 frames of images in one second, and a display duration of each frame of an image is the same. In a display phase of each frame, for example, every time of refreshing 4 rows or 5 rows of sub-pixel, the active level of the second enabling signal occurs once.

Herein, by controlling the frequency of the duration control signal, it is possible to control a frequency of the connection between the current control circuit 211 and the light-emitting device 22; and by controlling the duty ratio of the duration control signal, it is possible to control the duration of the connection between the current control circuit 211 and the light-emitting device 22. In a light-emitting phase of the display phase of the frame, a total light-emitting duration of the light-emitting device 22 (i.e., a sum of a plurality of connection durations) is determined by controlling the frequency of the connection between the current control circuit 211 and the light-emitting device 22 and a duration of each connection.

In a case where the gray scale to be displayed by the light-emitting device 22 is greater than or equal to a threshold gray scale, the duration control circuit 212 may use the first enabling signal as the duration control signal. As a result, in the light-emitting phase, the current control circuit 211 and the light-emitting device 22 are always in a connection state, i.e., a conductive path is always formed between the pixel driving circuit 21 and the light-emitting device 22. In this case, the driving signal generated by the current control circuit 211 may be continuously transmitted to the light-emitting device 22, thereby realizing a display of a high gray scale.

In a case where the gray scale to be displayed by the light-emitting device 22 is less than the threshold gray scale, the duration control circuit 212 may use the second enabling signal as the duration control signal. As a result, in the light-emitting phase, the current control circuit 211 and the light-emitting device 22 are alternately in the connection state and a disconnection state under control of the high frequency pulse signal of the second enabling signal. In this case, the driving signal generated by the current control circuit 211 may be intermittently transmitted to the light-emitting device 22, so that the light-emitting device 22 periodically receives the driving signal. For example, the light-emitting device 22 stops receiving the driving signal for a period of time after receiving the driving signal for a period of time, and then stops receiving the driving signal for a period of time after receiving the driving signal for a period of time again. In this way, a duration of forming a conductive path between the pixel driving circuit 21 and the light-emitting device 22 is shortened, a duration of transmitting the driving signal to the light-emitting device 22 is shortened, and a total light-emitting duration of the light-emitting device 22 is shortened, thereby realizing a display of a low gray scale.

In the present disclosure, the current control circuit 211 and the duration control circuit 212 in the same sub-pixel 2 are both electrically connected to the same data line DL through the data signal terminal Data. That is, the current control circuit 211 and the duration control circuit 212 are both electrically connected to the same data signal terminal Data, and are electrically connected to the same data line DL through the data signal terminal Data. The data signal transmitted by the data line DL may be transmitted to the current control circuit 211 and the duration control circuit 212 through the data signal terminal Data.

In the above implementation manner, as shown in FIG. 1, a multi-output selection circuit 4' is provided. The multi-output selection circuit 4' is electrically connected to a plurality of current data lines DI, a plurality of duration data lines DT, a first current selection signal line $DI\_MUX_1$, a second current selection signal line $DI\_MUX_2$, a first duration selection signal line $DT\_MUX_1$, and a second duration selection signal line $DT\_MUX_2$. The multi-output selection circuit 4' transmits current data signals SI to the current data lines DI in different periods under control of a first current selection signal and a second current selection signal, and transmits duration data signals ST to the duration data lines DT under control of a first duration selection signal and a second duration selection signal.

Figure 2:
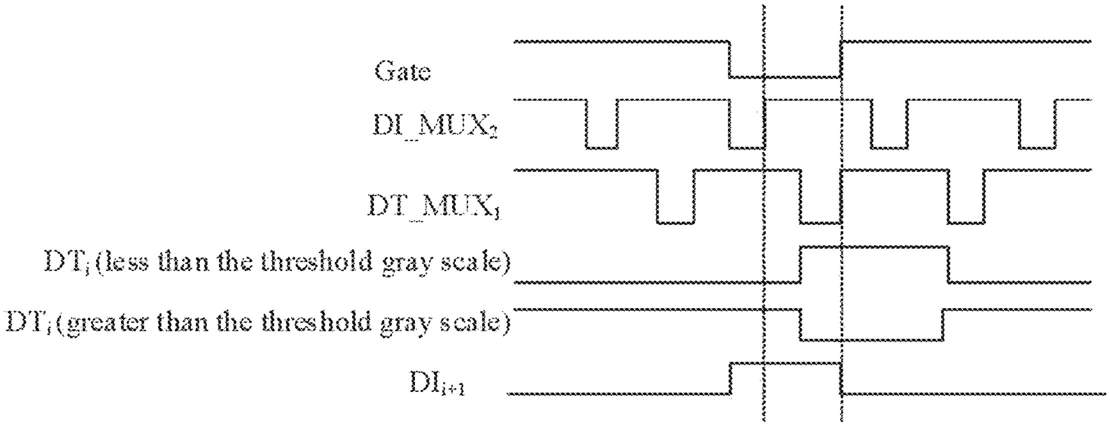
FIG. 2 is a timing diagram corresponding to the display substrate shown in FIG. 1, in accordance with an implementation.

In FIG. 2, $DI\_MUX_2$ represents the second current selection signal, $DT\_MUX_1$ represents the first duration selection signal, Gate represents a scanning signal received by an n-th rows of sub-pixels, $DT_i$ (less than a threshold gray scale) represents a duration data signal received by a sub-pixel in the n-th row and an i-th column in a case where a gray scale to be displayed is less than the threshold gray scale, $DT_i$ (greater than the threshold gray scale) represents a duration data signal received by the sub-pixel in the n-th row and the i-th column in a case where the gray scale to be displayed is greater than the threshold gray scale, $DI_{i+1}$ represents a current data signal received by a sub-pixel in the n-th row and an (i+1)-th column.

In the above implementation manner, the current control circuit and the duration control circuit are both electrically connected to the scanning signal terminal. As can be seen from FIG. 2, of two adjacent sub-pixels in a same row of sub-pixels, a writing and compensation phase corresponding to a current control circuit of one sub-pixel coincides with a phase of generating a duration control signal corresponding to a duration control circuit of the other sub-pixel. In a phase of the scanning signal being at an active level (i.e., a low level), after a current data signal is written to the (i+1)-th current data line $DI_{i+1}$ under control of the second current selection signal, a level of the second current selection signal becomes an inactive level, so that the (i+1)-th current data line $DI_{i+1}$ is in a floating state. In a phase of generating the duration control signal, after a level of the first duration selection signal becomes an active level, a duration data signal is written to the i-th duration data line $DT_i$ under control of the first duration selection signal. In a case where the gray scale to be displayed by the sub-pixel in the n-th row and the i-th column is greater than the threshold gray scale, a level of the duration data signal is changed from a high level to a low level. Correspondingly, a level of the current data signal of the (i+1)-th current data line $DI_{i+1}$ is pulled down. As a result, luminance of the sub-pixel in the n-th row and the (i+1)-th column increase, and the poor phenomenon of the luminance difference in the column direction occurs.

In embodiments of the present disclosure, only the current control circuit 211 is electrically connected to the scanning signal terminal Gate, the duration control circuit 212 is electrically connected to other signal terminal, and both the current control circuit 211 and the duration control circuit 212 are electrically connected to the same data line DL. The active level of the data signal is written in the different periods, and it may be ensured that a writing and compensation phase corresponding to a current control circuit 211 of a certain sub-pixel 2 does not coincide with a phase of generating a duration control signal by a duration control circuit 212 of another sub-pixel 2 (the another sub-pixel 2 and the certain sub-pixel 2 are located in the same row and are adjacent to each other). In this way, the signal crosstalk between the two adjacent data lines DL may be avoided, and a situation that a level of a data signal written to a current control circuit 211 of the another sub-pixel 2 changes due to a change in a level of a data signal written to a duration control circuit 212 of the certain sub-pixel 2 may be avoided. As a result, it is beneficial to improve the poor phenomenon of the luminance difference in the column direction.

Figure 10:
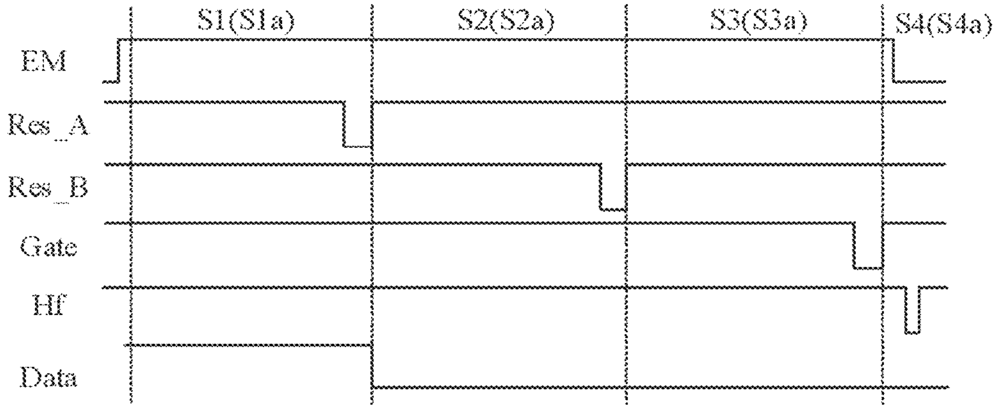
FIG. 10 is a timing diagram corresponding to the circuit of the sub-pixel shown in FIG. 7, in accordance with some embodiments of the present disclosure.
Figure 11:
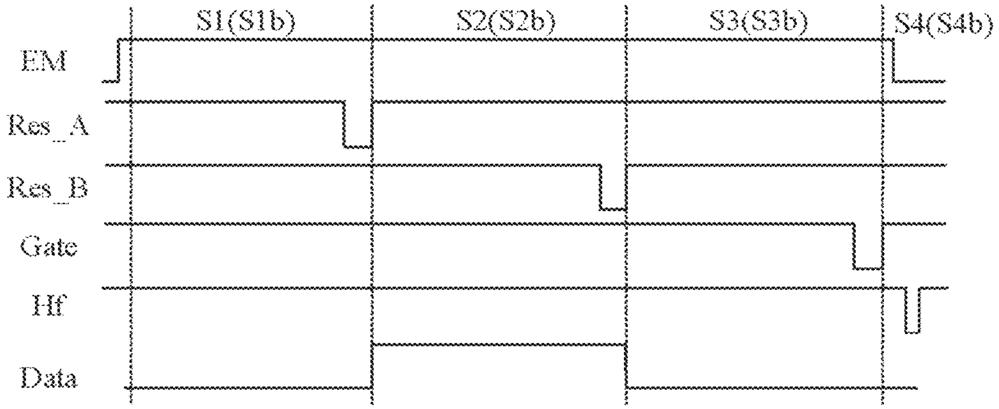
FIG. 11 is another timing diagram corresponding to the circuit of the sub-pixel shown in FIG. 7, in accordance with some embodiments of the present disclosure.

In some embodiments, as shown in FIGS. 10 and 11, an active level period of the first reset signal (using the same reference character "Res_A" as the first reset signal terminal) does not coincide with an active level period of the second reset signal (using the same reference character "Res_B" as the second reset signal terminal). Of the data signal, one of a level corresponding to the active level of the first reset signal and a level corresponding to the active level of the second reset signal is an active level.

That is, in a phase of the level of the first reset signal being the active level, the level of the data signal may be an active level or an inactive level. In a phase of the level of the second reset signal being the active level, the level of the data signal may be the active level or the inactive level. However, the level of the data signal in the phase of the level of the first reset signal being the active level is opposite to the level of the data signal in the phase of the level of the second reset signal being the active level.

Correspondingly, there are two relationships between an active level of the data signal and both an active level of the first reset signal and an active level of the second reset signal. One relationship is that: in a phase of a level of the first reset signal being an active level, a level of the data signal is an active level, and in a phase of a level of the second reset signal being an active level, the level of the data signal is an inactive level. The other relationship is that: in the phase of the level of the first reset signal being the active level, the level of the data signal is the inactive level, and in the phase of the level of the second reset signal being the active level, the level of the data signal is the active level.

It will be noted that embodiments of the present disclosure do not limit a sequence of the phase of the level of the first reset signal being the active level and the phase of the level of the second reset signal is the active level, and may be set depending on actual needs.

As for the same sub-pixel 2, the first reset signal, the second reset signal and the data signal are set through the above manner. In the phase of generating the duration control signal, the duration control circuit 212 may use the second enabling signal as the duration control signal only under a common control of the data signal and the first reset signal; or the duration control circuit 212 may use the first enabling signal as the duration control signal only under a common control of the data signal and the second reset signal. In this way, it is beneficial to ensure operating performance of the duration control circuit 212, and ensure that the duration control circuit 212 may select only one of the first enabling signal and the second enabling signal as the duration control signal so as to improve stability of signal selection. As a result, controllability of the gray scale to be displayed by the light-emitting device 22 may be improved.

In some embodiments, as shown in FIG. 6, the duration control circuit 212 includes: a first control sub-circuit 2121, a second control sub-circuit 2122 and a third control sub-circuit 2123.

In some examples, as shown in FIG. 6, the first control sub-circuit 2121 is at least electrically connected to the data signal terminal Data, the first reset signal terminal Res_A, the second enabling signal terminal Hf and a second node N2. The first control sub-circuit 2121 is configured to transmit the second enabling signal to the second node N2 in response to the data signal and the first reset signal.

For example, in a case where the level of the data signal is the active level and the level of the first reset signal is the active level, the first control sub-circuit 2121 may transmit the second enabling signal as the duration control signal to the second node N2 under the control of the data signal and the first reset signal.

In some examples, as shown in FIG. 6, the second control sub-circuit 2122 is at least electrically connected to the data signal terminal Data, the second reset signal terminal Res_B, the first enabling signal terminal EM and the second node N2. The second control sub-circuit 2122 is configured to transmit the first enabling signal to the second node N2 in response to the data signal and the second reset signal.

For example, in a case where the level of the data signal is the active level and the level of the second reset signal is the active level, the second control sub-circuit 2122 may transmit the first enabling signal as the duration control signal to the second node N2 under the control of the data signal and the second reset signal.

In some examples, as shown in FIG. 6, the third control sub-circuit 2123 is electrically connected to the first node N1, the second node N2 and the light-emitting device 22. The third control sub-circuit 2123 is configured to control a duration of a connection between the first node N1 and the light-emitting device 22 under control of a signal from the second node N2.

For example, in a case where the first control sub-circuit 2121 transmits the second enabling signal to the second node N2, the third control sub-circuit 2123 may connect the first node N1 and the light-emitting device 22 under the control of the second enabling signal. Since the second enabling signal is the high frequency pulse signal, the first node N1 and the light-emitting device 22 are in alternating connection and disconnection states. The duration of the connection between the first node N1 and the light-emitting device 22 is a total duration of a plurality of connection durations.

In a case where the second control sub-circuit 2122 transmits the first enabling signal to the second node N2, the third control sub-circuit 2123 may connect the first node N1 and the light-emitting device 22 under the control of the first enabling signal. In the light-emitting phase, the first node N1 and the light-emitting device 22 may be always connected.

Herein, based on the setting manner of the active levels of the first reset signal, the second reset signal and the data signal, in the phase of generating the duration control signal, only one of the first control sub-circuit 2121 and the second control sub-circuit 2122 may operate. In this way, the selection of the duration control signal may be realized, a situation that the light-emitting device 22 displays an abnormal gray scale due to the simultaneous operation of the first control sub-circuit 2121 and the second control sub-circuit 2122 may be avoided.

In some embodiments, as shown in FIG. 6, the current control circuit 211 includes: a data writing sub-circuit 2111, a driving sub-circuit 2112, a compensation sub-circuit 2113, and a light-emitting control sub-circuit 2114.

In some examples, as shown in FIG. 6, the data writing sub-circuit 2111 is electrically connected to the scanning signal terminal Gate, the data signal terminal Data, and a fifth node N5. The data writing sub-circuit 2111 is configured to transmit the data signal to the fifth node N5 under control of the scanning signal.

For example, in a case where the level of the scanning signal is the active level, the data writing sub-circuit 2111 may be turned on under control of the scanning signal, receive the data signal, and transmit the data signal to the fifth node N5.

In some examples, as shown in FIG. 6, the driving sub-circuit 2112 is at least electrically connected to the first node N1, the fifth node N5 and a sixth node N6. The driving sub-circuit 2112 is configured to transmit a signal from the fifth node N5 to the first node N1 under control of a voltage of the sixth node N6.

For example, the signal from the fifth node N5 may be the data signal transmitted by the data writing sub-circuit 2111. In a case where the voltage of the sixth node N6 is at an active level, the driving sub-circuit 2112 may be turned on under the control of the voltage of the sixth node N6, and transmit the signal from the fifth node N5 to the first node N1.

In some examples, as shown in FIG. 6, the compensation sub-circuit 2113 is electrically connected to the scanning signal terminal Gate, the first node N1 and the sixth node N6. The compensation sub-circuit 2113 is configured to transmit a signal from the first node N1 to the sixth node N6 under the control of the scanning signal to compensate a threshold voltage of the driving sub-circuit 2112.

For example, the signal from the first node N1 may be the data signal transmitted by the data writing sub-circuit 2111. In a case where the level of the scanning signal is the active level, the compensation sub-circuit 2113 may be turned on under the control of the scanning signal, and transmit the signal from the first node N1 to the sixth node N6 to compensate the threshold voltage of the driving sub-circuit 2112.

Since both the data writing sub-circuit 2111 and the compensation sub-circuit 2113 are electrically connected to the scanning signal terminal Gate, the data writing sub-circuit 2111 and the compensation sub-circuit 2113 may be turned on simultaneously under the control of the scanning signal. The data signal transmitted by the data signal terminal Data may be transmitted to the sixth node N6 through the data writing sub-circuit 2111, the driving sub-circuit 2112 and the compensation sub-circuit 2113 in sequence, until the driving sub-circuit 2112 is turned off and the compensation for the threshold voltage of the driving sub-circuit 2112 is completed.

In some examples, as shown in FIG. 6, the light-emitting control sub-circuit 2114 is electrically connected to the first enabling signal terminal EM, the first voltage signal terminal VDD and the fifth node N5. The light-emitting control sub-circuit 2114 is configured to transmit the first voltage signal to the fifth node N5 under the control of the first enabling signal.

For example, in a case where the level of the first enabling signal is the active level, the light-emitting control sub-circuit 2114 may be turned on under the control of the first enabling signal, receive the first voltage signal, and transmit the first voltage signal to the fifth node N5.

Herein, in a case where the duration control signal controls the connection between the first node N1 and the light-emitting device 22, the driving sub-circuit 2112 may generate the driving signal according to the first voltage signal from the fifth node N5 and the data signal written to the sixth node N6, and transmit the driving signal to the light-emitting device 22 to drive the light-emitting device 22 to emit light.

The data signal is written to the current control circuit 211 and the duration control circuit 212 in the different periods, the data writing sub-circuit 2111 is electrically connected to the scanning signal terminal Gate, the first control sub-circuit 2121 is electrically connected to the first reset signal terminal Res_A, and the second control sub-circuit 2122 is electrically connected to the second reset signal terminal Res_B. Therefore, the active level period of the scanning signal does not coincide with the active level period of the first reset signal and the active level period of the second reset signal. In this way, the phase of compensating the threshold voltage of the driving sub-circuit 2112 is in non-coincidence with the phase of using the duration control signal by the first control sub-circuit 2121 and the phase of using the duration control signal by the second control sub-circuit 2122. It is beneficial to avoid the signal crosstalk between the two adjacent data lines DL, and avoid the situation that the level of the data signal written to the driving sub-circuit 2112 changes due to the change in the level of the data signal written to the duration control circuit 212. As a result, it is beneficial to improve the poor phenomenon of the luminance difference in the column direction.

In some embodiments, as shown in FIG. 6, the current control circuit 211 further includes: a reset sub-circuit 2115.

In some examples, as shown in FIG. 6, the reset sub-circuit 2115 is electrically connected to the first reset signal terminal Res_A, an initial signal terminal Vinit, the sixth node N6 and the light-emitting device 22. The reset sub-circuit 2115 is configured to transmit an initial signal received at the initial signal terminal Vinit to the sixth node N6 and the light-emitting device 22 in response to the first reset signal.

For example, the reset sub-circuit 2115 is electrically connected to the anode of the light-emitting device 22. The initial signal transmitted by the initial signal terminal Vinit may be a direct current low level signal.

For example, in a case where the level of the first reset signal is the active level, the reset sub-circuit 2115 may be turned on under the control of the first reset signal, receives the initial signal, and transmits the initial signal to the sixth node N6 and the anode of the light-emitting device 22 to reset the sixth node N6 and the anode of the light-emitting device 22.

By providing the reset sub-circuit 2115, it is possible to provide a reference voltage for the sixth node N6 and the anode of the light-emitting device 22, eliminate residual charge in a display process of a previous frame, and improve controllability of the pixel driving circuit 21.

Structures of each sub-circuit included in the current control circuit 211 and each sub-circuit included in the duration control circuit 212 will be schematically described below with reference to FIG. 7. Of course, the structures of each sub-circuit included in the current control circuit 211 and each sub-circuit included in the duration control circuit 212 are not limited to this.

In some examples, as shown in FIG. 7, the first control sub-circuit 2121 includes: a first transistor T1, a second transistor T2, and a first capacitor C1.

For example, as shown in FIG. 7, a control electrode of the first transistor T1 is electrically connected to the first reset signal terminal Res_A, a first electrode of the first transistor T1 is electrically connected to the data signal terminal Data, and a second electrode of the first transistor T1 is electrically connected to the third node N3.

For example, in the case where the level of the first reset signal is the active level (i.e., a low level), the first transistor T1 may be turned on under the control of the first reset signal, receive the data signal, and transmit the data signal to the third node N3.

For example, as shown in FIG. 7, a control electrode of the second transistor T2 is electrically connected to the third node N3, a first electrode of the second transistor T2 is electrically connected to the second enabling signal terminal Hf, and a second electrode of the second transistor T2 is electrically connected to the second node N2.

For example, a voltage of the third node N3 is determined by the level of the data signal. In a case where the level of the data signal transmitted to the third node N3 is a low level, the voltage of the third node N3 is at the low level. The second transistor T2 may be turned on under control of the level of the third node N3, receive the second enabling signal as the duration control signal, and transmit the second enabling signal to the second node N2.

For example, as shown in FIG. 7, a first electrode of the first capacitor C1 is electrically connected to the initial signal terminal Vinit, and a second electrode of the first capacitor C1 is electrically connected to the third node N3.

The first capacitor C1 has a storage function, and may store the data signal transmitted to the third node N3.

For example, in a case where the level of the data signal is an inactive level (i.e., a high level), the voltage of the third node N3 is at the high level, and the second transistor T2 may be turned off under control of the voltage of the third node N3. After the first transistor T1 is turned off, the first capacitor C1 may discharge electricity. As a result, the voltage of the third node N3 remains at the high level, and the second transistor T2 remains in a turn-off state.

For another example, in a case where the level of the data signal is a low level, the voltage of the third node N3 is at the low level, and the second transistor T2 may be turned on under control of the voltage of the third node N3. After the first transistor T1 is turned off, the first capacitor C1 may discharge electricity. As a result, the voltage of the third node N3 remains at the low level, and the second transistor T2 remains in a turn-on state, and continuously transmits the second enabling signal to the second node N2.

In some examples, as shown in FIG. 7, the second control sub-circuit 2122 includes: a third transistor T3, a fourth transistor T4 and a second capacitor C2.

For example, as shown in FIG. 7, a control electrode of the third transistor T3 is electrically connected to the second reset signal terminal Res_B, a first electrode of the third transistor T3 is electrically connected to the data signal terminal Data, and a second electrode of the third transistor T3 is electrically connected to the fourth node N4.

For example, in the case where the level of the second reset signal is a low level, the third transistor T3 may be turned on under control of the second reset signal, receive the data signal, and transmit the data signal to the fourth node N4.

For example, as shown in FIG. 7, a control electrode of the fourth transistor T4 is electrically connected to the fourth node N4, a first electrode of the fourth transistor T4 is electrically connected to the first enabling signal terminal EM, and a second electrode of the fourth transistor T4 is electrically connected to the second node N2.

For example, the voltage of the fourth node N4 is determined by the level of the data signal. In a case where the level of the data signal transmitted to the fourth node N4 is at a low level, the voltage of the fourth node N4 is at the low level. The fourth transistor T4 may be turned on under control of the level of the fourth node N4, receive the first enabling signal as the duration control signal, and transmit the first enabling signal to the second node N2.

For example, as shown in FIG. 7, a first electrode of the second capacitor C2 is electrically connected to the initial signal terminal Vinit, and a second electrode of the second capacitor C2 is electrically connected to the fourth node N4.

The second capacitor C2 has a storage function, and may store the data signal transmitted to the fourth node N4.

For example, in the case where the level of the data signal is the high level, the voltage of the fourth node N4 is at the high level, and the fourth transistor T4 may be turned off under control of the voltage of the fourth node N4. After the third transistor T3 is turned off, the second capacitor C2 may discharge electricity. As a result, the voltage of the fourth node N4 remains at the high level, and the fourth transistor T4 may remain in a turn-off state.

For another example, in the case where the level of the data signal is the low level, the voltage of the fourth node N4 is at the low level, and the fourth transistor T4 may be turned on under control of the voltage of the fourth node N4. After the third transistor T3 is turned off, the second capacitor C2 may discharge electricity. As a result, the voltage of the fourth node N4 remains at the low level, and the fourth transistor T4 remains in a turn-on state, and continuously transmits the first enabling signal to the second node N2.

Herein, based on the setting manner of the active levels of the first reset signal, the second reset signal and the data signal, in the phase of generating the duration control signal, only the second transistor T2 is turned on, and the second enabling signal as the duration control signal is transmitted to the second node N2; or only the fourth transistor T4 is turned on, and the first enabling signal as the duration control signal is transmitted to the second node N2. In this way, the selection of the duration control signal may be realized, a situation that the light-emitting device 22 displays an abnormal gray scale due to the second transistor T2 and the fourth transistor T4 being simultaneously in a turn-on state may be avoided.

In some examples, as shown in FIG. 7, the third control sub-circuit 2123 includes: a fifth transistor T5.

For example, as shown in FIG. 7, a control electrode of the fifth transistor T5 is electrically connected to the second node N2, a first electrode of the fifth transistor T5 is electrically connected to the first node N1, and a second electrode of the fifth transistor T5 is electrically connected to the light-emitting device 22.

For example, in a case where the second transistor T2 transmits the second enabling signal to the second node N2, since the second enabling signal is the high frequency pulse signal, the fifth transistor T5 may be alternately turned on and turned off under the control of the second enabling signal. As a result, the first node N1 and the light-emitting device 22 are in the alternating connection and a disconnection states.

For another example, in a case where the fourth transistor T4 transmits the first enabling signal to the second node N2, the fifth transistor T5 remains in a turn-on state under the control of the first enabling signal, so that the first node N1 and the light-emitting device 22 may be always connected.

In some examples, as shown in FIG. 7, the data writing sub-circuit 2111 includes: a sixth transistor T6.

For example, as shown in FIG. 7, a control electrode of the sixth transistor T6 is electrically connected to the scanning signal terminal Gate, a first electrode of the sixth transistor T6 is electrically connected to the data signal terminal Date, and a second electrode of the sixth transistor T6 is electrically connected to the fifth node N5.

For example, in a case where the level of the scanning signal is a low level, the sixth transistor T6 may be turned on under the control of the scanning signal, receive the data signal, and transmit the data signal to the fifth node N5.

In some examples, as shown in FIG. 7, the driving sub-circuit 2112 includes: a seventh transistor T7 and a third capacitor C3.

For example, as shown in FIG. 7, a control electrode of the seventh transistor T7 is electrically connected to the sixth node N6, a first electrode of the seventh transistor T7 is electrically connected to the fifth node N5, and a second electrode of the seventh transistor T7 is electrically connected to the first node N1.

For example, in a case where the level of the sixth node N6 is a low level, the seventh transistor T7 may be turned on under the control of the voltage of the sixth node N6, and transmit the data signal from the fifth node N5 to the first node N1.

For example, as shown in FIG. 7, a first electrode of the third capacitor C3 is electrically connected to the sixth node N6, and a second electrode of the third capacitor C3 is electrically connected to the first voltage signal terminal VDD.

For example, the third capacitor C3 has a storage function, may store the signal transmitted to the sixth node N6, and may also discharge electricity to remain the level of the sixth node N6.

In some examples, as shown in FIG. 7, the compensation sub-circuit 2113 includes: an eighth transistor T8.

For example, as shown in FIG. 7, a control electrode of the eighth transistor T8 is electrically connected to the scanning signal terminal Gate, a first electrode of the eighth transistor T8 is electrically connected to the first node N1, and a second electrode of the eighth transistor T8 is electrically connected to the sixth node N6.

For example, in the case where the level of the scanning signal is the low level, the eighth transistor T8 may be turned on under the control of the scanning signal, and transmit the data signal from the first node N1 to the sixth node N6 until the seventh transistor T7 is turned off and compensation for a threshold voltage of the seventh transistor T7 is completed.

Herein, after the eighth transistor T8 is turned off, the third capacitor C3 may discharge electricity to remain the voltage of the sixth node N6.

In some examples, as shown in FIG. 7, the light-emitting control sub-circuit 2114 includes: a ninth transistor T9.

For example, as shown in FIG. 7, a control electrode of the ninth transistor T9 is electrically connected to the first enabling signal terminal EM, a first electrode of the ninth transistor T9 is electrically connected to the first voltage signal terminal VDD, and a second electrode of the ninth transistor T9 is electrically connected to the fifth node N5.

For example, in a case where the level of the first enabling signal is a low level, the ninth transistor T9 may be turned on under the control of the first enabling signal, receive the first voltage signal, and transmit the first voltage signal to the fifth node N5.

In some examples, as shown in FIG. 7, the reset sub-circuit 2115 includes: a tenth transistor T10 and an eleventh transistor T11.

For example, as shown in FIG. 7, a control electrode of the tenth transistor T10 is electrically connected to the first reset signal terminal Res_A, a first electrode of the tenth transistor T10 is electrically connected to the initial signal terminal Vinit, and a second electrode of the tenth transistor T10 is electrically connected to the sixth node N6. A control electrode of the eleventh transistor T11 is electrically connected to the first reset signal terminal Res_A, a first electrode of the eleventh transistor T11 is electrically connected to the initial signal terminal Vinit, and a second electrode of the eleventh transistor T11 is electrically connected to the light-emitting device 22.

For example, in a case where the level of the first reset signal is a low level, the tenth transistor T10 and the eleventh transistor T11 may be simultaneously turned on under the control of the first reset signal. The tenth transistor T10 may receive and transmit the initial signal to the sixth node N6 to reset the sixth node N6. The eleventh transistor T11 may receive and transmit the initial signal to the light-emitting device 22 to reset the light-emitting device 22.

Figure 8:
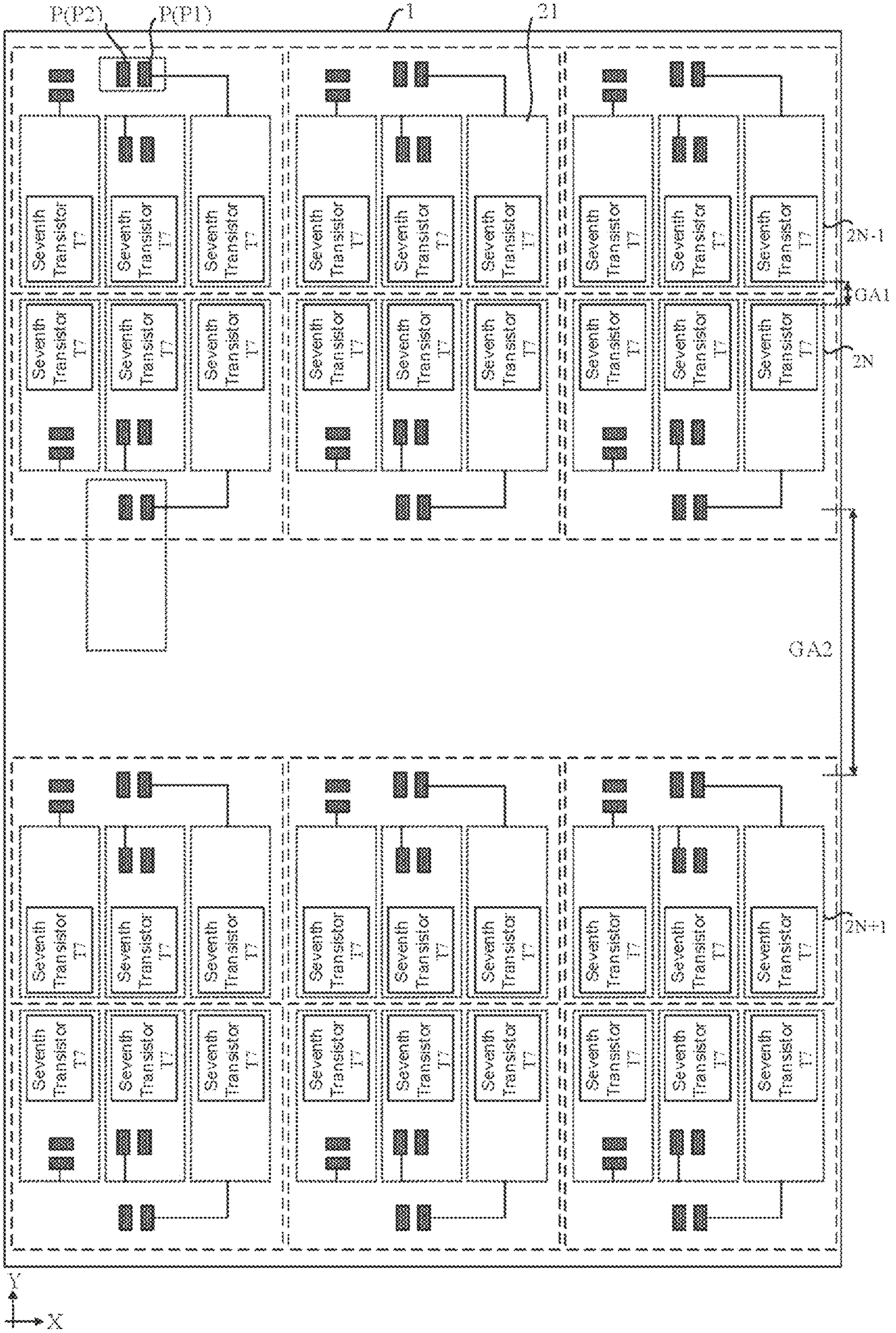
FIG. 8 is a distribution diagram of bonding pads and pixel driving circuits, in accordance with some embodiments of the present disclosure.
Figure 9:
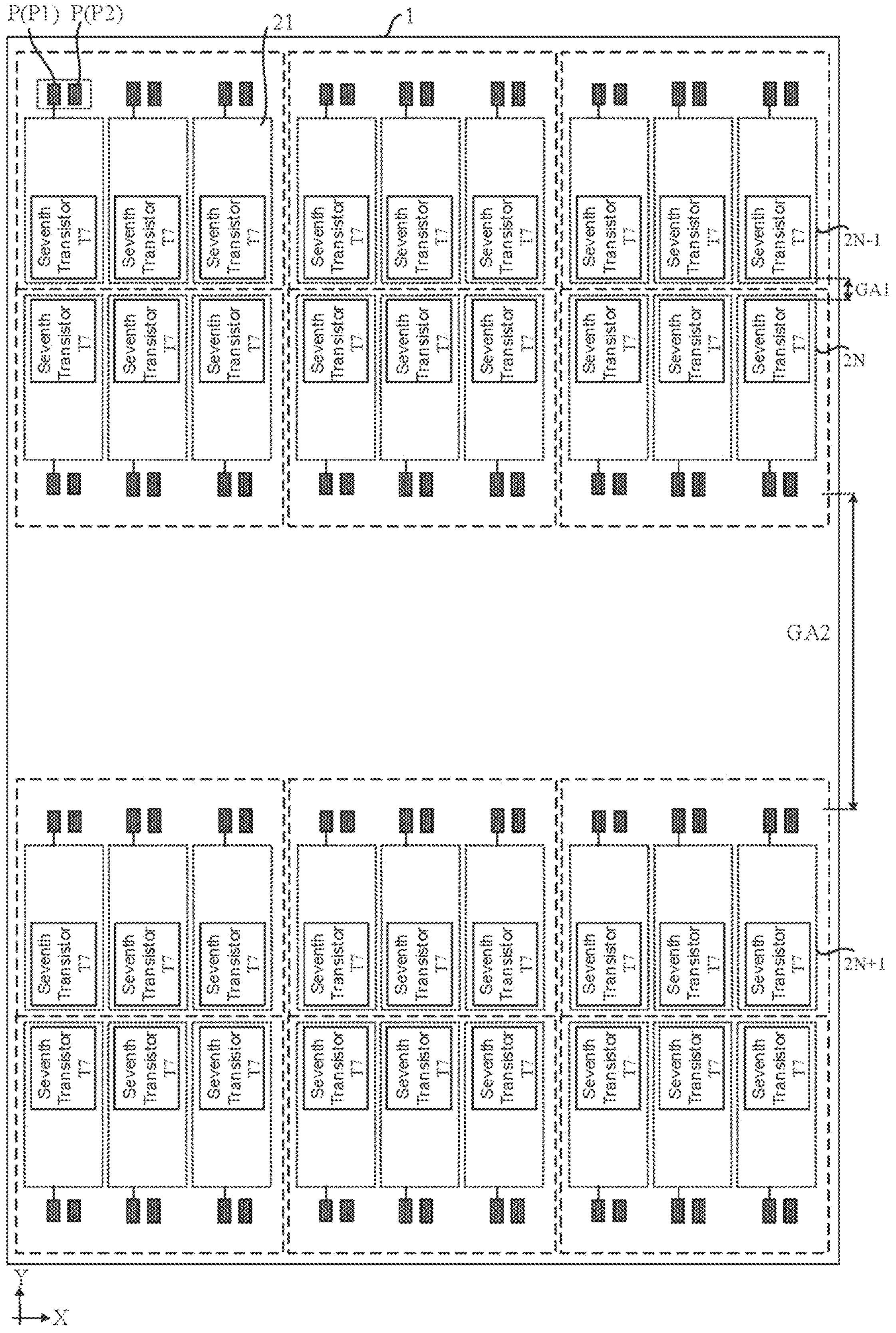
FIG. 9 is another distribution diagram of bonding pads and pixel driving circuits, in accordance with some embodiments of the present disclosure.

In some embodiments, as shown in FIGS. 8 and 9, the display substrate 100 may further include: a plurality of bonding pads P provided on a side of the pixel driving circuits 21 away from the substrate 1. The plurality of bonding pads P includes a plurality of anode bonding pads P1 and a plurality of cathode bonding pads P2, and a single anode bonding pad P1 and a single cathode bonding pad P2 may constitute a bonding pad pair. A single pixel driving circuit 21 may correspond to at least one bonding pad pair.

In some examples, the display substrate 100 further includes a plurality of second voltage signal lines. In each bonding pad pair, an anode bonding pad P1 may be electrically connected to an end of the reset sub-circuit 2115 and an end of the third control sub-circuit 2123 in a pixel driving circuit 21, so as to receive the initial signal transmitted by the reset sub-circuit 2115 and the driving signal transmitted by the third control sub-circuit 2123; and a cathode bonding pad P2 may be electrically connected to a single second voltage signal line to receive a second voltage signal transmitted by the second voltage signal line. The cathode bonding pad P2 may be, for example, used as the second voltage signal terminal VSS.

For example, as shown in FIGS. 8 and 9, a pixel driving circuit 21 corresponds to a single bonding pad pair, and the plurality of sub-pixels 2 included in the display substrate 100 include red sub-pixels, green sub-pixels and blue sub-pixels. For example, a red sub-pixel, a green sub-pixel and a blue sub-pixel may constitute a pixel unit (as shown by the dotted box in FIGS. 8 and 9).

In some examples, the light-emitting device 22 electrically connected to the pixel driving circuit 21 may include an anode electrode pin and a cathode electrode pin. The anode electrode pin may be bonded to the anode bonding pad P1 in the bonding pad pair to be electrically connected to the reset sub-circuit 2115 and the third control sub-circuit 2123. The cathode electrode pin may be bonded to the cathode bonding pad P2 in the bonding pad pair to be electrically connected to the second voltage signal terminal VSS.

For example, as shown in FIGS. 8 and 9, orthographic projections of the plurality of bonding pads P on the substrate 1 do not overlap with an orthographic projection of the seventh transistor T7 in each pixel driving circuit 21 on the substrate 1. In this way, in a process of bonding the light-emitting device 22 to corresponding bonding pads and applying pressure, an adverse effect on the seventh transistor T7 may be avoided, and a good driving performance of the seventh transistor T7 may be ensured.

For example, the light-emitting device 22 may be of various structures, which may be selected depending on actual needs. For example, the structure of the light-emitting device 22 may be a face-up structure, a vertical structure, or a face-down structure.

Herein, there are various arrangements of the bonding pad pairs, as long as it may satisfy a requirement of gap (the requirement of the gap herein, for example, referring to a gap between visible pixel units on a macro level) between pixel units (the visible pixel unit being constituted by light-emitting devices in the pixel unit on the macro level), and bonding ability between the light-emitting device 22 and the bonding pad pair.

For example, an arrangement of bonding pad pairs corresponding to each pixel unit is the same as the arrangement of the light-emitting devices 22 of the sub-pixels in the pixel unit.

For example, in each pixel unit, the light-emitting devices 22 are arranged in a shape of Chinese character "pin (品)". Correspondingly, as shown in FIG. 8, the bonding pad pairs corresponding to each pixel unit may be arranged in the shape of Chinese character "pin (品)". In this case, in a same pixel unit, centers of bonding pad pairs may be connected to form a triangle (for example, an acute-angled triangle). In this way, it is beneficial to ensure that there is a large gap between any two adjacent bonding pad pairs, so that there is a large gap between any two adjacent light-emitting devices 22. It may not only satisfy the requirement of the gap between the pixel units, but also reduce difficulty of bonding the light-emitting device 22.

For another example, in each pixel unit, the light-emitting devices 22 are arranged horizontally. Correspondingly, as shown in FIG. 9, the bonding pad pairs corresponding to each pixel unit may be arranged horizontally.

It will be understood that, in the examples of the present disclosure, as shown in FIGS. 8 and 9, any three adjacent rows of sub-pixels are respectively a (2N−1)-th row of sub-pixels, a 2N-th row of sub-pixels, and a (2N+1)-th row of sub-pixels. A region between the (2N−1)-th row of sub-pixels and the 2N-th row of the sub-pixels is a first gap region GA1. A region between the 2N-th row of the sub-pixels and the (2N+1)-th row of sub-pixels is a second gap region GA2. Of the (2N−1)-th row of sub-pixels and the 2N-th row of the sub-pixels, pixel driving circuits 21 are proximate to the first gap region GA1. Of the 2N-th row of the sub-pixels and the (2N+1)-th row of sub-pixels, pixel driving circuits 21 is away from the second gap region GA2. N is a positive integer.

For example, for the (2N−1)-th row of sub-pixels and the 2N-th row of the sub-pixels, the pixel driving circuits 21 are symmetrically arranged with respect to the first gap region GA1; and the pixel driving circuits 21 are proximate to the first gap region GA1, and bonding pad pairs are away from the first gap region GA1. For the 2N-th row of the sub-pixels and the (2N+1)-th row of sub-pixels, the pixel driving circuits 21 are symmetrically arranged with respect to the second gap region GA2 and the pixel driving circuit 21 are away from the second gap region GA2, and bonding pad pairs are proximate to the second gap region GA2.

For example, in the first direction Y, a dimension of the second gap region GA2 is greater than a dimension of the first gap region GA1.

In this way, on the premise of satisfying the requirement of the gap between the pixel units, distribution uniformity of the pixel units may be improved, a compact arrangement of the pixel driving circuits 21 may be realized, and a wiring space may be effectively utilized.

For example, in a same row of pixel units, any two adjacent pixel units have a same gap therebetween. In a same column of pixel units, any two adjacent pixel units have a same gap therebetween.

It will be noted that, in the example, only positions of the pixel driving circuits 21 in each sub-pixels 2 and the bonding pad pairs are limited, and it is not limited whether a specific structure of the pixel driving circuit 21 is symmetrical. Since the pixel driving circuit 21 includes a plurality of film layers, in a process of forming the plurality of film layers, there may be a difference in sizes of film layers included in different pixel driving circuits 21 due to unavoidable factors such as process errors. In this way, the pixel driving circuits 21 in the (2N−1)-th row of sub-pixels and the pixel driving circuits 21 in the 2N-th row of the sub-pixels may not be arranged strictly symmetrically with respect to the first gap region GA1, and the pixel driving circuits 21 in the 2N-th row of the sub-pixels and the pixel driving circuits 21 in the (2N+1)-th row of sub-pixels may not be arranged strictly symmetrically with respect to the second gap region GA2.

In some embodiments, as shown in FIGS. 12, 13, 16 and 17, a same data line DL is electrically connected to at least one column of sub-pixels.

Figure 12:
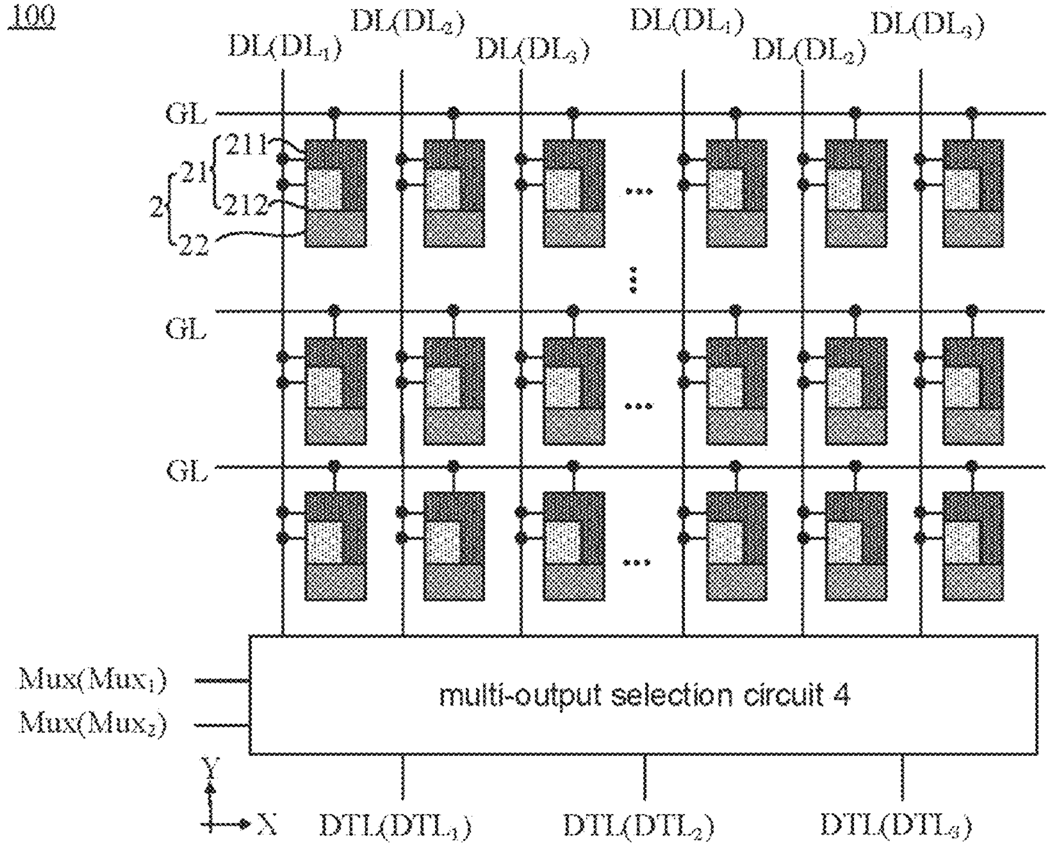
FIG. 12 is a structural diagram of another display substrate, in accordance with some embodiments of the present disclosure.
Figure 13:
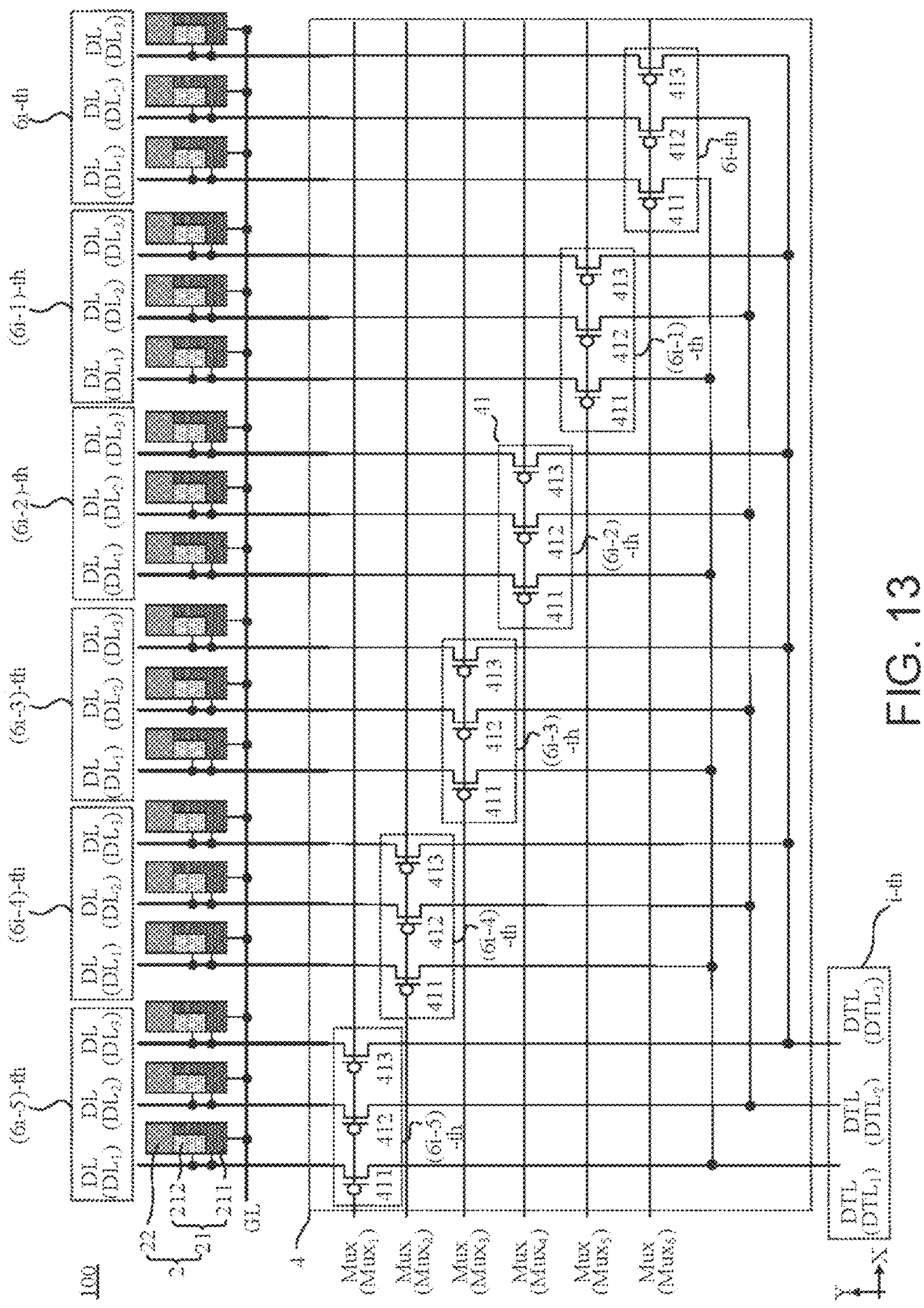
FIG. 13 is a structural diagram of yet another display substrate, in accordance with some embodiments of the present disclosure.

In some examples, as shown in FIGS. 12 and 13, a data line DL may be electrically connected to a single column of sub-pixels, that is, the data lines DL and the columns of sub-pixels are in one-to-one correspondence. The number of the data lines DL is equal to the number of the columns of sub-pixels. In this case, the data signal transmitted by each data line DL is only written to a corresponding column of sub-pixels.

Figure 16:
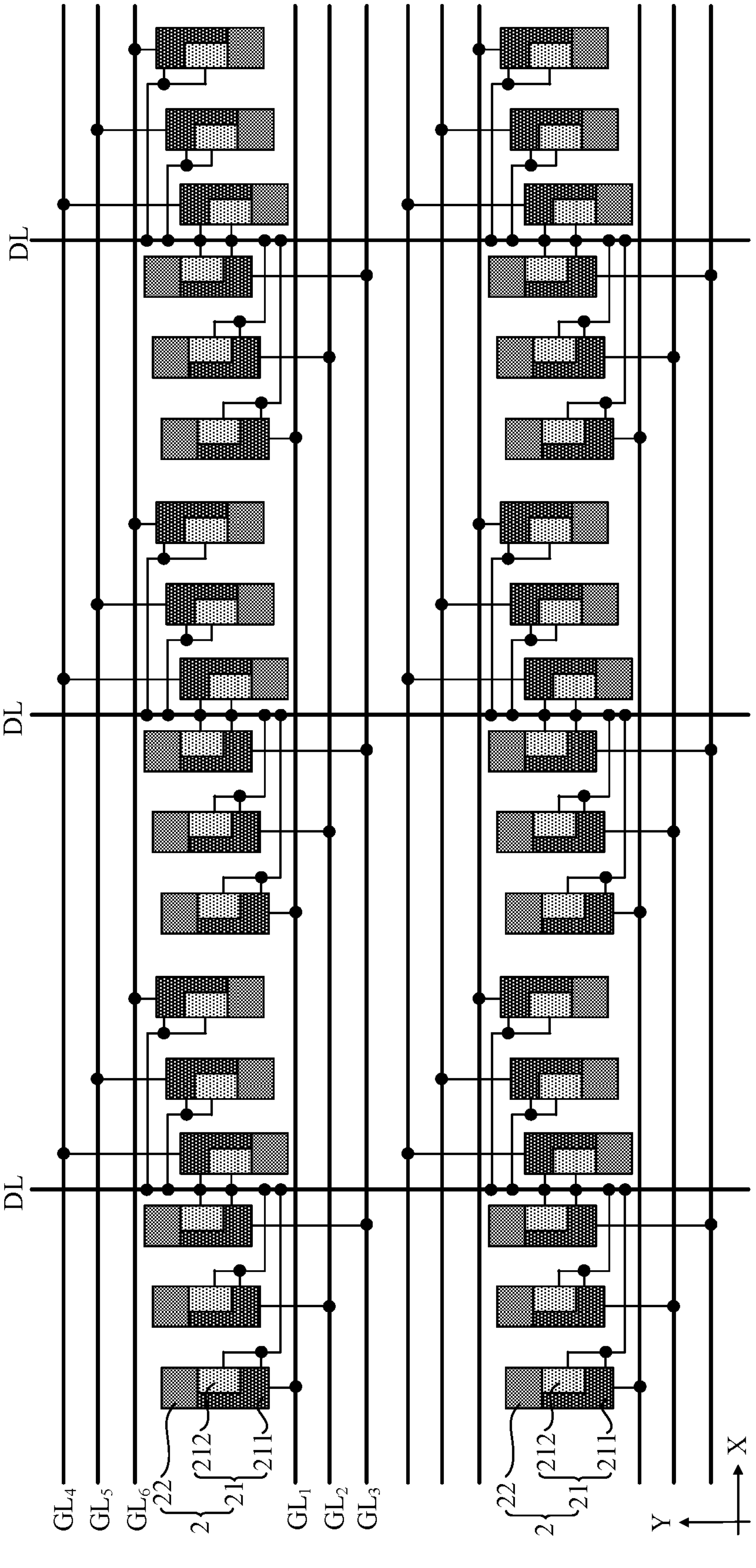
FIG. 16 is a structural diagram of yet another display substrate, in accordance with some embodiments of the present disclosure.
Figure 17:
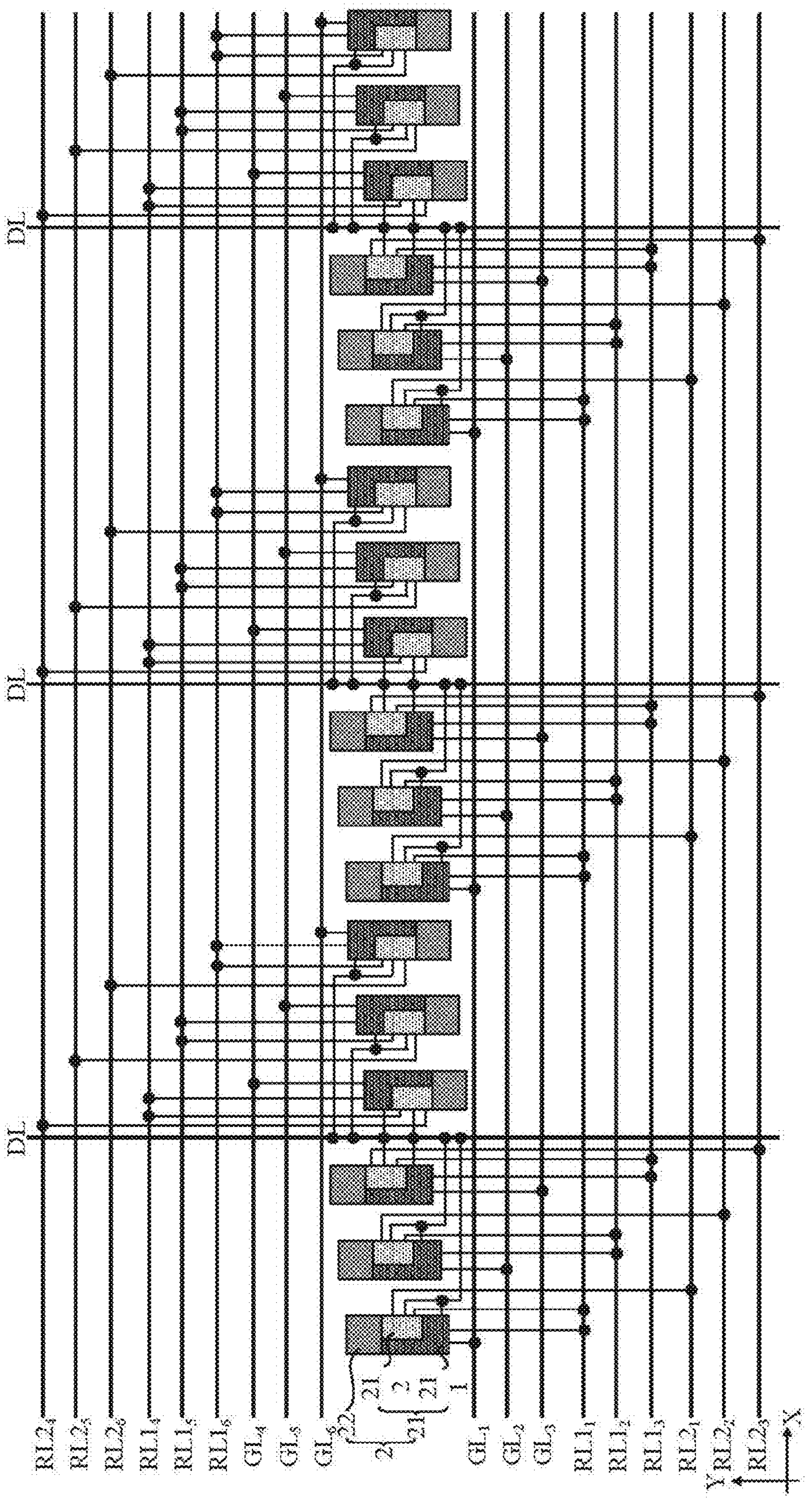
FIG. 17 is a structural diagram of yet another display substrate, in accordance with some embodiments of the present disclosure.

In some other examples, as shown in FIGS. 16 and 17, a data line DL may be electrically connected to multiple columns of sub-pixels. The number of the data lines DL is less than the number of the columns of sub-pixels. In this case, the data signal transmitted by each data line DL may be written to corresponding multiple columns of sub-pixels in different periods.

Herein, the same data line DL is electrically connected to at least one column of sub-pixels, which is beneficial to reduce the number of the data lines DL, reduce a space occupied by the data lines DL, and increase the wiring space of the display substrate 100.

In some embodiments, as shown in FIGS. 12, 13, 16 and 17, at least one column of sub-pixels is disposed between any two adjacent data lines DL.

In some examples, as shown in FIGS. 12 and 13, a single column of sub-pixels is disposed between the any two adjacent data lines DL. Correspondingly, each data line DL may be electrically connected to a single column of sub-pixels.

In some other examples, as shown in FIGS. 16 and 17, multiple columns of sub-pixels are disposed between any two adjacent data lines DL. Correspondingly, each data line DL may be electrically connected to multiple columns of sub-pixels.

It will be noted that, in a case where there is no sub-pixel between two adjacent data lines DL, there is a need to make the two adjacent data lines DL have a large gap therebetween to avoid forming parasitic capacitance between the two adjacent data lines DL. However, it is easy to increase the space occupied by the data lines DL in the display substrate 100, and increase the wiring difficulty.

In embodiments of the present disclosure, at least one column of sub-pixels is disposed between any two adjacent data lines DL, so that the any two adjacent data lines DL may be separated by the at least one column of sub-pixels. In this way, it is not only beneficial to reduce the space occupied by the data lines DL in the display substrate 100 and reduce the wiring difficulty, but also may prevent the signal crosstalk between the two adjacent data lines DL and ensure the accuracy of the data signal transmitted by each data line DL.

Figure 19:
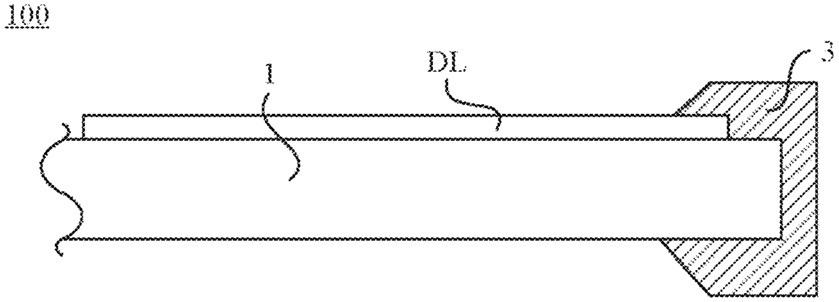
FIG. 19 is a structural diagram of yet another display substrate, in accordance with some embodiments of the present disclosure.
Figure 20:
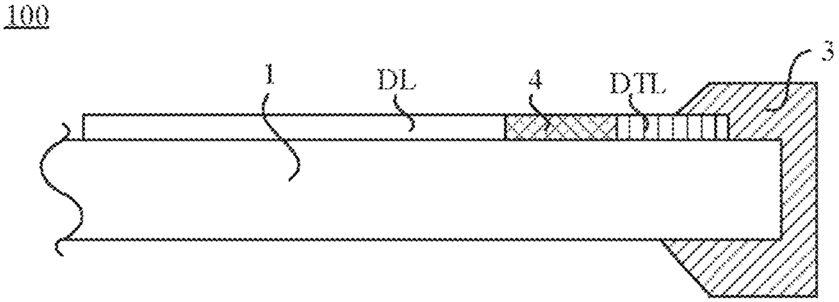
FIG. 20 is a structural diagram of yet another display substrate, in accordance with some embodiments of the present disclosure.

In some embodiments, as shown in FIGS. 19 and 20, the display substrate 100 further includes a plurality of connection wires 3 provided at an edge of the substrate 1. The plurality of sub-pixels 2 included in the display substrate 100 may be disposed at one side of the substrate 1, and a driving chip 200 included in the display apparatus 1000 may be disposed at the other side of the substrate 1.

In some examples, each connection wire 3 may have a U-shape. One end of the connection wire 3 may be located on the one side of the substrate 1 and electrically connected to at least one data line DL (for example, directly electrically connected to the data line DL or indirectly electrically connected to the data line DL), and the other end of the connection wire 3 may extend to the other side of the substrate 1. As shown in FIG. 22, the other end of the connection wire 3 may be electrically connected to the driving chip 200. For example, the driving chip 200 may provide a data signal for the connecting wire 3, and the connection wire 3 may transmit the data signal to the corresponding data line(s) DL.

For example, the above setting manner may be referred to as a side wiring manner.

The sub-pixels 2 are electrically connected to the driving chip 200 through the side wiring manner, which is beneficial to reduce a size of a bezel of the display substrate 100 and facilitates realization of a narrow bezel or even a bezel-less design.

In addition, in a case where a display apparatus 1000 is formed by tiling a plurality of display substrates 100, the display substrates 100 are tiled through the side wiring manner, which may effectively reduce a size of a seam and even realize seamless tiling. As a result, it is beneficial to realize the narrow bezel or even the bezel-less design.

The display substrate 100 provided by embodiments of the present disclosure has a small number of data lines DL. In this way, the number of the connection wires 3 may be correspondingly reduced, and then it is beneficial to improve a process yield of the side wiring, and improve a yield of the display substrate 100 and the display apparatus 1000.

In addition, in a case where a single data line DL is electrically connected to multiple columns of sub-pixels, the number of the connection wires 3 may be further reduced, which is beneficial to further improve the process yield of the side wiring, and further improve the yield of the display substrate 100 and the display apparatus 1000.

It will be noted that, in a case where the side wiring manner is used, there may be various setting manners for effectively reducing the number of the connection wires 3, which may be selected depending on actual needs. In addition, the various setting manners include, but are not limited to, the manners exemplified in embodiments of the present disclosure.

In an exemplary embodiment, as shown in FIGS. 12 and 13, the display substrate 100 further includes: a multi-output selection circuit 4, a plurality of data transmission lines DTL and a plurality of selection signal lines Mux.

In some examples, the multi-output selection circuit 4 may be located on a same side of the substrate 1 as the sub-pixels 2. The multi-output selection circuit 4 may be electrically connected to the plurality of data lines DL included in the display substrate 100.

In some examples, the plurality of data transmission lines DTL may be located on the same side of the substrate 1 as the sub-pixels 2. The plurality of data transmission lines DTL may extend in the first direction Y, and are electrically connected to the multi-output selection circuit 4. Of course, a portion of each data transmission line DTL may extend in the first direction Y, and another portion of the data transmission line DTL may extend in the second direction X.

In some examples, the plurality of selection signal lines Mux may be located on the same side of the substrate 1 as the sub-pixels 2. The plurality of selection signal lines Mux may extend in the second direction X, and are electrically connected to the multi-output selection circuit 4. Of course, a portion of each selection signal line Mux may extend in the first direction Y, and another portion of the selection signal line Mux may extend in the second direction X.

In some examples, the multi-output selection circuit 4 is configured to transmit data signals transmitted by the plurality of data transmission lines DTL to the plurality of data lines DL in different periods under control of selection signals transmitted by the plurality of selection signal lines Mux.

It will be noted that the number of the data transmission lines DTL is less than the number of the data lines DL, and a single data transmission line DTL corresponds to multiple data lines DL. The multi-output selection circuit 4 has a selection function. Under action of the selection signal, the multi-output selection circuit 4 may only transmit the data signal transmitted by each data transmission line DTL to a data line DL of corresponding multiple data lines DL in a certain period, and then to another data line DL of the corresponding multiple data lines DL in a next period.

In this case, the plurality of data lines DL may be electrically connected to a source driving circuit (for example, the driving chip 200) that generates the data signals through the plurality of data transmission lines DTL. Since the number of the data transmission lines DTL is less than the number of the data lines DL, the number of pins used that are electrically connected to the driving chip 200 may be reduced, which is beneficial to improve a yield of electrical connection the driving chip 200 and the pins, and improve the yield of the display apparatus 1000.

In addition, in a case where the display substrate 100 includes the connection wires 3, one end of each connection wire 3 located on the side of the substrate 1 may be electrically connected to a single data transmission line DTL, so that the connection wire 3 is electrically connected to corresponding multiple data lines DL through the data transmission line DTL and the multi-output selection circuit 4 in sequence.

Since the number of the data transmission lines DTL is less than the number of the data lines DL, the number of the connection wires 3 may be reduced, which may effectively improve the yield of the side wiring.

In some embodiments, as shown in FIGS. 12 and 13, the plurality of data lines DL at least include a plurality of first data lines $DL_1$, a plurality of second data lines $DL_2$ and a plurality of third data lines $DL_3$. The plurality of data transmission lines DTL at least include a plurality of first data transmission lines $DTL_1$, a plurality of second data transmission lines $DTL_2$ and a plurality of third data transmission lines $DTL_3$. The multi-output selection circuit 4 may include a plurality of selection transistor groups 41. The selection transistor groups 41 may be electrically connected to the selection signal lines Mux and the first data lines $DL_1$, the second data lines $DL_2$ and the third data lines $DL_3$.

For example, each selection transistor group 41 may be electrically connected to a single selection signal line Mux and a single first data line $DL_1$, a single second data line $DL_2$ and a single third data line $DL_3$.

In some examples, as shown in FIG. 13, the first data transmission line $DTL_1$ is electrically connected to at least two selection transistor groups 41, and electrically connected to corresponding first data lines $DL_1$ through the at least two selection transistor groups 41.

Since each selection transistor group 41 may be electrically connected to a single selection signal line Mux and a single first data line $DL_1$, each first data transmission line $DTL_1$ may correspond to at least two selection signal lines Mux and at least two first data lines $DL_1$. A data signal transmitted by the first data transmission line $DTL_1$ may be transmitted to one first data line $DL_1$ corresponding thereto under control of a selection signal transmitted by one of the selection signal lines Mux, and to another first data line $DL_1$ corresponding thereto under control of a selection signal transmitted by another one of the selection signal lines Mux, so as to write the data signal transmitted by the first data transmission line $DTL_1$ in different periods.

For example, the first data transmission line $DTL_1$ may be electrically connected to two, three, four or six selection transistor groups 41. Correspondingly, the first data transmission line $DTL_1$ may be electrically connected to two, three, four or six first data lines $DL_1$.

In some examples, as shown in FIG. 13, the second data transmission line $DTL_2$ is electrically connected to the at least two selection transistor groups 41, and electrically connected to corresponding second data lines $DL_2$ through the at least two selection transistor groups 41.

Since each selection transistor group 41 may be electrically connected to a single selection signal line Mux and a single second data line $DL_2$, each second data transmission line $DTL_2$ may correspond to the at least two selection signal lines Mux and at least two second data lines $DL_2$. A data signal transmitted by the second data transmission line $DTL_2$ may be transmitted to a second data line $DL_2$ corresponding thereto under control of a selection signal transmitted by one of the selection signal lines Mux, and to another second data line $DL_2$ corresponding thereto under control of a selection signal transmitted by another one of the selection signal lines Mux, so as to write the data signal transmitted by the second data transmission line $DTL_2$ in different periods.

For example, the second data transmission line $DTL_2$ may be electrically connected to two, three, four or six selection transistor groups 41. Correspondingly, the second data transmission line $DTL_2$ may be electrically connected to two, three, four or six first data lines $DL_1$.

In some examples, as shown in FIG. 13, the third data transmission line $DTL_3$ is electrically connected to the at least two selection transistor groups 41, and electrically connected to corresponding third data lines $DL_3$ through the at least two selection transistor groups 41.

Since each selection transistor group 41 may be electrically connected to a single selection signal line Mux and a single third data line $DL_3$, each third data transmission line $DTL_3$ may correspond to the at least two selection signal lines Mux and at least two third data lines $DL_3$. A data signal transmitted by the third data transmission line $DTL_3$ may be transmitted to a third data line $DL_3$ corresponding thereto under control of a selection signal transmitted by one of the selection signal lines Mux, and to another third data line $DL_3$ corresponding thereto under control of a selection signal transmitted by another one of the selection signal lines Mux, so as to write the data signal transmitted by the third data transmission line $DTL_3$ in different periods.

For example, the third data transmission line $DTL_3$ may be electrically connected to two, three, four or six selection transistor groups 41. Correspondingly, the third data transmission line $DTL_3$ may be electrically connected to two, three, four or six first data lines $DL_3$.

Optionally, as shown in FIG. 13, the number of the multiple selection signal lines Mux may be six, and correspondingly, the number of the multiple selection transistor groups 41 may be 6 m, where m is a positive integer. In this case, a first selection signal line $Mux_1$ may be electrically connected to a (6i-5)-th selection transistor group 41, and a second selection signal line $Mux_2$ may be electrically connected to a (6i-4)-th selection transistor group 41, a third selection signal line $Mux_3$ may be electrically connected to a (6i-3)-th selection transistor group 41, a fourth selection signal line $Mux_4$ may be electrically connected to a (6i-2)-th selection transistor group 41, a fifth selection signal line $Mux_5$ may be electrically connected to a (6i-1)-th selection transistor group 41, and a sixth selection signal line $Mux_6$ is electrically connected to a 6i-th selection transistor group 41. Here, i takes values from 1 to m in sequence.

In this case, with reference to FIG. 13, a connection relationship between each selection transistor group 41 and both the data transmission line DTL and the data line DL will be schematically described.

For example, an i-th first data transmission line $DTL_1$ may be electrically connected to the (6i-5)-th selection transistor group 41, and electrically connected to a (6i-5)-th first data line $DL_1$ through the (6i-5)-th selection transistor group 41; the i-th first data transmission line $DTL_1$ may be further electrically connected to the (6i-4)-th selection transistor group 41, and electrically connected to a (6i-4)-th first data line $DL_1$ through the (6i-4)-th selection transistor group 41; the i-th first data transmission line $DTL_1$ may be further electrically connected to the (6i-3)-th selection transistor group 41, and electrically connected to a (6i-3)-th first data line $DL_1$ through the (6i-3)-th selection transistor group 41; the i-th first data transmission line $DTL_1$ may be further electrically connected to the (6i-2)-th selection transistor group 41, and electrically connected to a (6i-2)-th first data line $DL_1$ through the (6i-2)-th selection transistor group 41; the i-th first data transmission line $DTL_1$ may be further electrically connected to the (6i-1)-th selection transistor group 41, and electrically connected to a (6i-1)-th first data line $DL_1$ through the (6i-1)-th selection transistor group 41; and the i-th first data transmission line $DTL_1$ may be further electrically connected to the 6i-th selection transistor group, and electrically connected to a 6i-th first data line $DL_1$ through the 6i-th selection transistor group.

For example, an i-th second data transmission line $DTL_2$ may be electrically connected to the (6i-5)-th selection transistor group 41, and electrically connected to a (6i-5)-th second data line $DL_2$ through the (6i-5)-th selection transistor group 41; the i-th second data transmission line $DTL_2$ may be further electrically connected to the (6i-4)-th selection transistor group 41, and electrically connected to a (6i-4)-th second data line $DL_2$ through the (6i-4)-th selection transistor group 41; the i-th second data transmission line $DTL_2$ may be further electrically connected to the (6i-3)-th selection transistor group 41, and electrically connected to a (6i-3)-th second data line $DL_2$ through the (6i-3)-th selection transistor group 41; the i-th second data transmission line $DTL_2$ may be further electrically connected to the (6i-2)-th selection transistor group 41, and electrically connected to a (6i-2)-th second data line $DL_2$ through the (6i-2)-th selection transistor group 41; the i-th second data transmission line $DTL_2$ may be further electrically connected to the (6i-1)-th selection transistor group 41, and electrically connected to a (6i-1)-th second data line $DL_2$ through the (6i-1)-th selection transistor group 41; and the i-th second data transmission line $DTL_2$ may be further electrically connected to the 6i-th selection transistor group, and electrically connected to a 6i-th second data line $DL_2$ through the 6i-th selection transistor group.

For example, an i-th third data transmission line $DTL_3$ may be electrically connected to the (6i-5)-th selection transistor group 41, and electrically connected to a (6i-5)-th third data line $DL_3$ through the (6i-5)-th selection transistor group 41; the i-th third data transmission line $DTL_3$ may be further electrically connected to the (6i-4)-th selection transistor group 41, and electrically connected to a (6i-4)-th third data line $DL_3$ through the (6i-4)-th selection transistor group 41; the i-th third data transmission line $DTL_3$ may be further electrically connected to the (6i-3)-th selection transistor group 41, and electrically connected to a (6i-3)-th third data line $DL_3$ through the (6i-3)-th selection transistor group 41; the i-th third data transmission line $DTL_3$ may be further electrically connected to the (6i-2)-th selection transistor group 41, and electrically connected to a (6i-2)-th third data line $DL_3$ through the (6i-2)-th selection transistor group 41; the i-th third data transmission line $DTL_3$ may be further electrically connected to the (6i-1)-th selection transistor group 41, and electrically connected to a (6i-1)-th third data line $DL_3$ through the (6i-1)-th selection transistor group 41; and the i-th third data transmission line $DTL_3$ may be further electrically connected to the 6i-th selection transistor group, and electrically connected to a 6i-th third data line $DL_3$ through the 6i-th selection transistor group.

In some examples, as shown in FIGS. 12 and 13, first data transmission lines $DTL_1$, second data transmission lines $DTL_2$ and third data transmission lines $DTL_3$ are arranged periodically. That is, the first data transmission lines $DTL_1$, the second data transmission lines $DTL_2$ and the third data transmission lines $DTL_3$ may be cyclically arranged in a certain sequence.

There are a plurality of arrangement sequences, which may be set depending on actual needs.

For example, as shown in FIGS. 12 and 13, an arrangement sequence of a single cycle may be: the first data transmission line $DTL_1$, the second data transmission line $DTL_2$ and the third data transmission line $DTL_3$; or the second data transmission line $DTL_2$, the first data transmission line $DTL_1$ and the third data transmission line $DTL_3$; or the third data transmission line $DTL_3$, the first data transmission line $DTL_1$ and the second data transmission line $DTL_2$.

In some examples, as shown in FIGS. 12 and 13, first data lines $DL_1$, second data lines $DL_2$ and third data lines $DL_3$ are arranged periodically. That is, the first data lines $DL_1$, the second data lines $DL_2$ and the third data lines $DL_3$ may be cyclically arranged in a certain sequence.

There are a plurality of arrangement sequences, which may be set depending on actual needs.

For example, as shown in FIGS. 12 and 13, an arrangement sequence of a single cycle may be: the first data line $DL_1$, the second data line $DL_2$ and the third data line $DL_3$; or the second data line $DL_2$, the first data line $DL_1$ and the third data line $DL_3$; or the third data line $DL_3$, the first data line $DL_1$ and the second data line $DL_2$.

For example, as shown in FIGS. 12 and 13, the arrangement sequence of the data transmission lines DTL may be the same as the arrangement sequence of the data lines DL, which may be conducive to improving regularity of the wiring and reducing the difficulty of the wiring.

Optionally, sub-pixels 2 electrically connected to the first data line $DL_1$ may all be red sub-pixels, sub-pixels 2 electrically connected to the second data line $DL_2$ may all be green sub-pixels, and sub-pixels 2 electrically connected to the third data line $DL_3$ may all be blue sub-pixels.

Optionally, in a case where the sub-pixels 2 further includes white sub-pixels, the data lines DL may include, for example, fourth data lines $DL_4$, and the data transmission lines DTL may include, for example, fourth data transmission lines $DTL_4$. As for a connection relationship between each selection transistor group 41 and both the fourth data line $DL_4$ and the fourth data transmission line $DTL_4$, reference may be made to the description in the above examples, which will not be repeated here.

In some embodiments, as shown in FIG. 13, the selection transistor group 41 at least includes: a first selection transistor 411, a second selection transistor 412, and a third selection transistor 413.

In some examples, as shown in FIG. 13, a control electrode of the first selection transistor 411 is electrically connected to the selection signal line Mux, a first electrode of the first selection transistor 411 is electrically connected to the first data transmission line $DTL_1$, and a second electrode of the first selection transistor 411 is electrically connected to the first data line $DL_1$.

For example, in a case where a level of the selection signal transmitted by the selection signal line Mux is a low level, the first selection transistor 411 may be turned on under control of the selection signal, and transmit a data signal from the first data transmission line $DTL_1$ to the first data line $DL_1$.

In some examples, as shown in FIG. 13, a control electrode of the second selection transistor 412 is electrically connected to the selection signal line Mux, a first electrode of the second selection transistor 412 is electrically connected to the second data transmission line $DTL_2$, and a second electrode of the second selection transistor 412 is electrically connected to the second data line $DL_2$.

For example, in the case where the level of the selection signal transmitted by the selection signal line Mux is the low level, the second selection transistor 412 may be turned on under control of the selection signal, and transmit a data signal from the second data transmission line $DTL_2$ to the second data line $DL_2$.

In some examples, as shown in FIG. 13, a control electrode of the third selection transistor 413 is electrically connected to the selection signal line Mux, a first electrode of the third selection transistor 413 is electrically connected to the third data transmission line $DTL_3$, and a second electrode of the third selection transistor 413 is electrically connected to the third data line $DL_3$.

For example, in the case where the level of the selection signal transmitted by the selection signal line Mux is the low level, the third selection transistor 413 may be turned on under control of the selection signal, and transmit a data signal from the third data transmission line $DTL_3$ to the third data line $DL_3$.

Optionally, as shown in FIG. 13, for example, the number of the selection signal lines Mux is six and the number of the selection transistor groups 41 is 6 m.

The i-th first data transmission line $DTL_1$ may be electrically connected to first selection transistors 411 in the (6i-5)-th selection transistor group 41 to the 6i-th selection transistor group 41. A data signal transmitted by the i-th first data transmission line $DTL_1$ may transmit to the (6i-5)-th first data line $DL_1$ to the 6i-th first data line $DL_1$ in different periods under control of a selection signal transmitted by the first selection signal line $Mux_1$, a selection signal transmitted by the second selection signal line $Mux_2$, a selection signal transmitted by the third selection signal line $Mux_3$, a selection signal transmitted by the fourth selection signal line $Mux_4$, a selection signal transmitted by the fifth selection signal line $Mux_5$, and a selection signal transmitted by the sixth selection signal line $Mux_6$, so as to write the data signal in the different periods.

The i-th second data transmission line $DTL_2$ may be electrically connected to second selection transistors 412 in the (6i-5)-th selection transistor group 41 to the 6i-th selection transistor group 41. A data signal transmitted by the i-th second data transmission line $DTL_2$ may transmit to the (6i-5)-th second data line $DL_2$ to the 6i-th second data line $DL_2$ in different periods under the control of the selection signal transmitted by the first selection signal line $Mux_1$, the selection signal transmitted by the second selection signal line $Mux_2$, the selection signal transmitted by the third selection signal line $Mux_3$, the selection signal transmitted by the fourth selection signal line $Mux_4$, the selection signal transmitted by the fifth selection signal line $Mux_5$, and the selection signal transmitted by the sixth selection signal line $Mux_6$, so as to write the data signal in the different periods.

The i-th third data transmission line $DTL_3$ may be electrically connected to third selection transistors 413 in the (6i-5)-th selection transistor group 41 to the 6i-th selection transistor group 41. A data signal transmitted by the i-th third data transmission line $DTL_3$ may transmit to the (6i-5)-th third data line $DL_3$ to the 6i-th third data line $DL_3$ in different periods under the control of the selection signal transmitted by the first selection signal line $Mux_1$, the selection signal transmitted by the second selection signal line $Mux_2$, the selection signal transmitted by the third selection signal line $Mux_3$, the selection signal transmitted by the fourth selection signal line $Mux_4$, the selection signal transmitted by the fifth selection signal line $Mux_5$, and the selection signal transmitted by the sixth selection signal line $Mux_6$, so as to write the data signal in the different periods.

It will be noted that, in the case where the sub-pixels 2 further includes the white sub-pixels, the selection transistor group 41 may further include, for example, a fourth selection transistor. As for an electrical connection relationship of the fourth selection transistor, reference may be made to the description in the above examples, which will not be repeated here.

In some examples, as shown in FIGS. 12 and 13, a same data line DL may be electrically connected to a single column of sub-pixels. That is, the number of the data lines DL is equal to the number of the columns of sub-pixels.

It will be understood that, in these examples, a same row of sub-pixels may be electrically connected to only a single gate line GL. That is, a scanning signal transmitted by each gate line GL may simultaneously control operation of each data writing sub-circuit 2111 and each compensation sub-circuit 2113 in the same row of sub-pixels.

In another exemplary embodiment, as shown in FIGS. 16 and 17, a same data line DL is electrically connected to at least two columns of sub-pixels, and a row of sub-pixels is electrically connected to at least two gate lines GL. The at least two gate lines GL are configured to transmit scanning signals to corresponding sub-pixels respectively, so as to control the row of sub-pixels to receive data signals transmitted by the data lines DL in different periods.

In some examples, since each sub-pixel 2 is electrically connected to a single data line DL and a single gate line GL, of the at least two gate lines GL, each gate line GL is only electrically connected to some sub-pixels 2 in the same row of sub-pixels. Moreover, in the same row of sub-pixels, at least two sub-pixels 2 are electrically connected to a same data line DL.

For example, the at least two sub-pixels 2 electrically connected to the same data line DL are electrically connected to different gate lines GL, respectively. Active level periods of scanning signals received by the at least two sub-pixels 2 may do not coincide. In this way, the at least two sub-pixels 2 may operate at different periods (for example, data writing sub-circuits 2111 and compensation sub-circuits 2113 in the different sub-pixels 2 may be turned on at different periods), and sequentially receives the data signal transmitted by the data line DL, so as to write the data signal in the different periods.

It will be noted that the number of the data lines DL is less than the number of the sub-pixels 2 in the same row of sub-pixels.

The gate lines GL and the data lines DL are arranged through the above arrangement, which may effectively reduce the number of the data lines DL included in the display substrate 100, reduce the space occupied by the data lines DL, and increase the wiring space of the display substrate 100.

In the case where the display substrate 100 includes the connection wires 3, a single data line DL may be electrically connected to a single connection wire 3. That is, the number of the data lines DL may be equal to the number of the connection wires 3. Since the number of the data lines DL is less than the number of the sub-pixels 2 in the same row of sub-pixels, the number of the connection wires 3 may also be effectively reduced, which may effectively improve the yield of the side wiring.

In some embodiments, as shown in FIGS. 16 and 17, in the same row of sub-pixels, any two adjacent sub-pixels 2 are electrically connected to different gate lines GL, respectively.

In this way, the two adjacent sub-pixels 2 (even more adjacent sub-pixels 2) may be electrically connected to the same data line DL. It is conducive to arranging the data line DL between the two adjacent sub-pixels 2, reducing gaps between the data line DL and the sub-pixels 2 electrically connected thereto, and reducing complexity of wiring between the data line DL and the sub-pixels 2 electrically connected thereto.

In some embodiments, as shown in FIGS. 16 and 17, a number of columns of sub-pixels 2 electrically connected to a same data line DL is equal to the number of gate lines GL electrically connected to the same row of sub-pixels.

In some examples, the number of the columns of sub-pixels 2 electrically connected to the same data line DL is n, and the number of the gate lines GL electrically connected to the same row of sub-pixels is also n. In the same row of sub-pixels, the n sub-pixels 2 electrically connected to the same data line DL are electrically connected to the n gate lines GL in a one-to-one correspondence.

In this way, it is conducive to controlling the same row of the sub-pixels in groups, and reducing the difficulty of the wiring and difficulty of controlling the same row of the sub-pixels.

Herein, the number of the columns of sub-pixels 2 electrically connected to the same data line DL, i.e., the number of the gate lines GL electrically connected to the same row of sub-pixels may be set depending on actual needs.

For example, the number of the columns of sub-pixels 2 electrically connected to the same data line DL may be two, three, four or six; correspondingly, the number of the gate lines GL electrically connected to the same row of sub-pixels may be two, three, four or six.

Optionally, as shown in FIGS. 16 and 17, the number of the columns of sub-pixels 2 electrically connected to the same data line DL is six. Correspondingly, the number of the gate lines GL electrically connected to the same row of sub-pixels is six. In this case, in the same row of sub-pixels, a first gate line $GL_1$ may be electrically connected to a (6i-5)-th sub-pixel 2, a second gate line $GL_2$ may be electrically connected to a (6i-4)-th sub-pixel 2, a third gate line $GL_3$ may be electrically connected to a (6i-3)-th sub-pixel 2, a fourth gate line $GL_4$ may be electrically connected to a (6i-2)-th sub-pixel 2, and a fifth gate line $GL_5$ may be electrically connected to a (6i-1)-th sub-pixel 2, and a sixth gate line $GL_6$ may be electrically connected to a 6i-th sub-pixel. The i-th data line DL may be electrically connected to a (6i-5)-th column of sub-pixels to a 6i-th column of sub-pixels.

Figure 18:
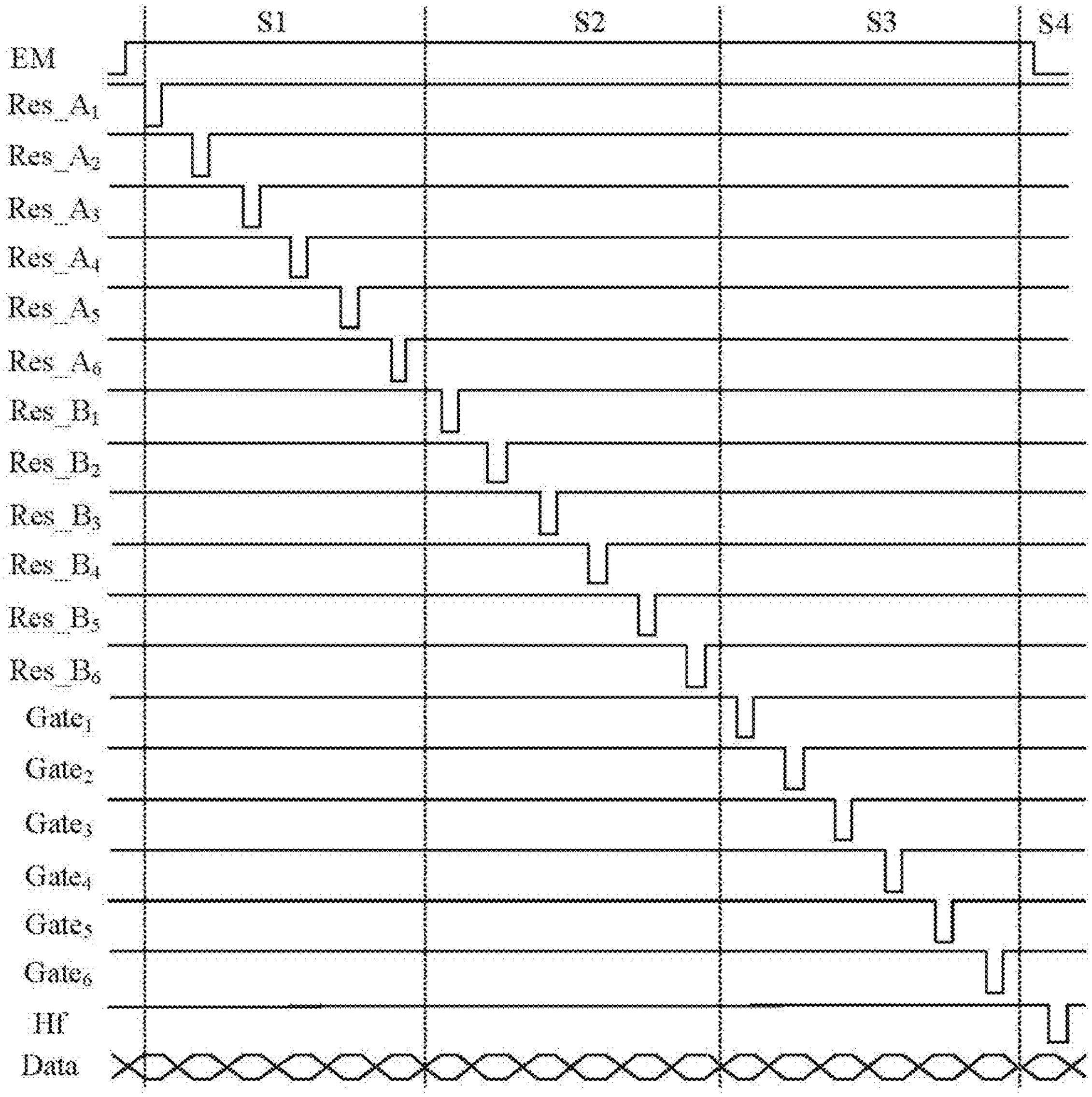
FIG. 18 is a timing diagram corresponding to the display substrate shown in FIG. 17, in accordance with some embodiments of the present disclosure.

For example, as shown in FIG. 18, levels of a scanning signal $Gate_1$ transmitted by the first gate line $GL_1$, a scanning signal $Gate_2$ transmitted by the second gate line $GL_2$, a scanning signal $Gate_3$ transmitted by the third gate line $GL_3$, a scanning signal $Gate_4$ transmitted by the fourth gate line $GL_4$, a scanning signal $Gate_5$ transmitted by the fifth gate line $GL_5$, and a scanning signal $Gate_6$ transmitted by the sixth grid line $GL_6$ become an active level in sequence. Of the six scanning signals, active level periods of any two adjacent scanning signals do not coincide. Correspondingly, data writing sub-circuits 2111 and compensation sub-circuits 2113 in the (6i-5)-th sub-pixel 2, the (6i-4)-th sub-pixel 2, the (6i-3)-th sub-pixel 2, the (6i-2)-th sub-pixel 2, the (6i-1)-th sub-pixel 2 and the 6i-th sub-pixel 2 may sequentially receive the data signal transmitted by the i-th data line DL, so as to write the data signal in the different periods.

In some embodiments, as shown in FIGS. 16 and 17, the at least two gate lines GL electrically connected to the same row of sub-pixels are respectively disposed on opposite sides of the row of sub-pixels. That is, the at least two gate lines GL may be divided into two groups. A group of gate lines GL may be disposed on one side of the row of sub-pixels, and the other group of gate lines GL may be disposed on the other side of the row of sub-pixels. For example, the numbers of the two groups of gate lines GL may be equal.

For example, the number of the gate lines GL electrically connected to the same row of sub-pixels is six. In this case, three gate lines GL may be disposed on one side of the row of sub-pixels, and the other three gate lines GL may be disposed on the other side of the row of sub-pixels.

Through the above arrangement manner of the gate lines GL, it is conducive to making gaps between different gate lines GL and sub-pixels 2 electrically connected thereto be small, and reducing complexity of wiring between the different gate lines GL and the sub-pixels 2 electrically connected thereto.

It will be noted that, in these embodiments, the number of the gate lines GL is relatively large, and correspondingly, the number of shift registers (for generating scanning signals) that need to be arranged in the display substrate 100 is also relatively large. In this case, the arrangement of the gate lines GL and the data lines DL in these embodiments may be applied to a display substrate with a low resolution, so as to avoid an adverse effect on the resolution of the display substrate 100.

Figure 3:
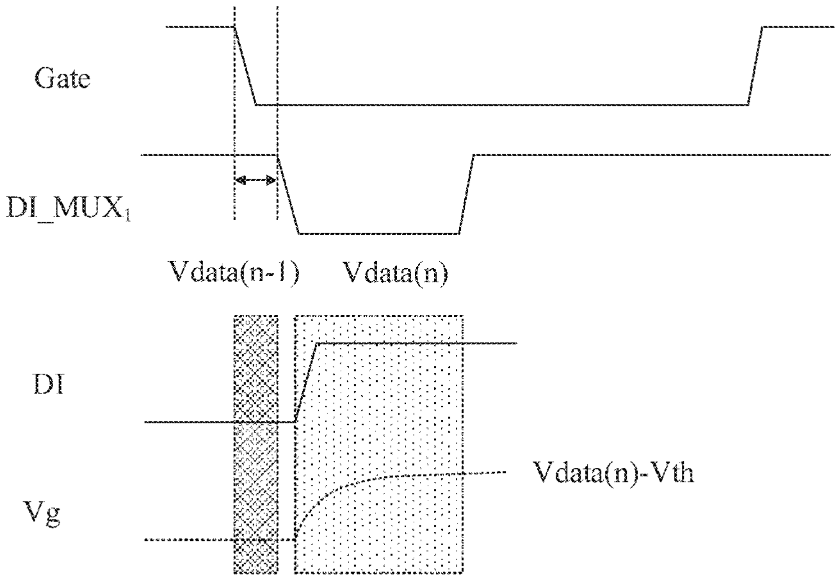
FIG. 3 is another timing diagram corresponding to the display substrate shown in FIG. 1, in accordance with an implementation.
Figure 4:
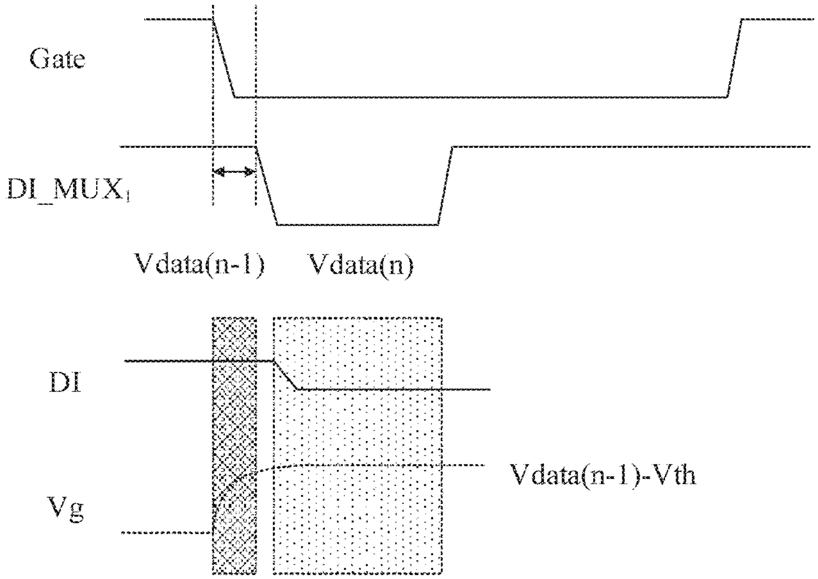
FIG. 4 is yet another timing diagram corresponding to the display substrate shown in FIG. 1, in accordance with an implementation.

In the above implementation manner, as shown in FIGS. 3 and 4, for any row of sub-pixels, after the scanning signal becomes an active level (i.e., a low level), the first current selection signal, the second current selection signal, the first duration selection signal and the second duration selection signal become a low level in different periods, so as to write the current data signal and the duration data signal in the different periods. In general, a time interval between signals are added (shown by double-headed arrows in FIGS. 3 and 4), so as to prevent the signal from being miswritten.

Herein, a writing and compensation phase corresponding to a current control circuit of a certain sub-pixel is taken as an example. After the level of the scanning signal becomes the low level, a current data signal is written to a corresponding current data line DI. After a previous frame is displayed, when a level of a first current selection signal corresponding to the sub-pixel becomes a high level, the previously written current data signal will be stored in the current data line DI through parasitic capacitance of the current data line DI. In this case, when a next frame is displayed, the current data signal may not be normally written to the current control circuit (i.e., not be normally written to a control electrode of a driving transistor in the current control circuit).

For example, in the display of the previous frame, the level of the current data signal is the low level (a voltage value thereof is Vdata(n−1)). In the display of the next frame, within a time interval after the level of the scanning signal becomes the low level and before the level of the first current selection signal changes, the current data signal stored in the current data line DI is first written to the current control circuit. After the level of the first current selection signal becomes the low level, as shown in FIG. 3, if the level of the current data signal (a voltage value thereof being Vdata(n)) in the display of the next frame is greater than the level of the current data signal in the display of the previous frame. The data current signal is able to be continuously written to the current control circuit (Vg shown in FIG. 3, where Vth being a threshold voltage of the current control circuit). As shown in FIG. 4, if the level of the current data signal (the voltage value thereof being Vdata (n)) in the display of the next frame is less than the level of the current data signal in the display of the previous frame, the writing of the data signal in the previous frame continues (Vg shown in FIG. 4). As a result, the data signal displayed in this frame is unable to be written normally, the driving transistor of the current control circuit is difficult to be turned on normally, and then it is difficult to display a gray scale required to be displayed.

In light of this, as shown in FIGS. 10 and 11, in some embodiments of the present disclosure, in a phase of generating the driving signal by the current control circuit 211, a period in which the level of the data signal becomes an active level is earlier than a period in which the level of the scanning signal become an active level.

That is, in a phase of generating the driving signal, the data signal may be firstly transmitted to a corresponding data line DL, and stored on parasitic capacitance of the corresponding data line DL; and then the level of the scanning signal becomes the active level, and the data signal is written to the sixth node N6 through the data writing sub-circuit 2111, the driving sub-circuit 2112 and the compensation sub-circuit 2113 in sequence, so as to complete compensation for the threshold voltage of the driving sub-circuit 2112.

In the phase of generating the driving signal by the current control circuit 211, the period in which the level of the data signal becomes the active level is earlier than the period in which the level of the scanning signal become the active level. Before the next frame is displayed, the data signal stored in the data line DL may be cleaned, so as to prevent residual data signal displayed in the previous frame. In this way, after the level of the scanning signal becomes the active level, a new data signal may be received, which may prevent the data signal displayed in the next frame from being unable to be normally written due to the residual data signal in the previous frame. As a result, each sub-pixel 2 may display a gray scale required to be displayed, and the display effect of the display substrate 100 may be improved.

In some examples, in a case where the display substrate 100 includes the multi-output selection circuit 4, in the phase of generating the driving signal by the current control circuit 211, a period of an active level of a selection signal transmitted by each selection signal line Mux is earlier than a period in which the level of the scanning signal becomes the active level.

In this way, it may be ensured that before the level of the scanning signal becomes the active level, the level of each selection signal has become the active level in sequence, the data signal is written to the corresponding data line DL in the different periods, and the corresponding data signal can be stored through the parasitic capacitance of the data line DL.

In some other examples, in a case where a same data line DL is electrically connected to at least two columns of sub-pixels, and a row of sub-pixels is electrically connected to at least two gate lines GL, as for each sub-pixel 2, in the phase of generating the driving signal by the current control circuit 211, the period in which the level of the data signal becomes the active level is earlier than the period in which the level of the scanning signal become the active level; as for different sub-pixels 2 electrically connected to the same gate line GL and electrically connected to different data lines DL, the scanning signal may have a plurality of active levels at intervals corresponding to the different sub-pixels 2, respectively. In this case, the levels of the different data signals all become the active levels before the corresponding active levels of the scanning signals.

Some embodiments of the present disclosure provide a driving method of a display substrate. The driving method includes: transmitting data signals to a plurality of data lines DL of the display substrate 100, and receiving, by a current control circuit 211 and a duration control circuit 212 of a same sub-pixel 2, a data signal.

For example, in a process of driving the display substrate 100 to display an image, an active level of the data signal is written to the current control circuit 211 and the duration control circuit 212 in different periods.

In this way, a writing and compensation phase corresponding to the current control circuit 211 is separated from, i.e., in non-coincidence with a phase of generating a duration control signal corresponding to the duration control circuit 212, and the level of the data signal is substantially unchanged in each phase. Signal crosstalk between two adjacent data lines DL may be effectively avoided, and a situation that the level of the data signal written to the current control circuit 211 changes due to the change in the level of the data signal written to the duration control circuit 212 may be avoided. As a result, it is beneficial to improve a poor phenomenon of a luminance difference in a column direction.

In some embodiments, as shown in FIGS. 6 and 7, the current control circuit 211 includes a data writing sub-circuit 2111, a driving sub-circuit 2112, a compensation sub-circuit 2113 and a light-emitting control sub-circuit 2114. The duration control circuit 212 includes a first control sub-circuit 2121, a second control sub-circuit 2122 and a third control sub-circuit 2123.

The driving method of the display substrate 100 in a single frame display phase will be schematically described below with reference to the structure of the sub-pixel 2 shown in FIG. 7.

In some examples, in a single frame display phase, the above driving method further includes: a first phase S1, a second phase S2, a third phase S3 and a fourth phase S4. In a case where, a gray scale to be displayed by the sub-pixel 2 of the display substrate 100 is different, the first phase S1 may be slightly different and the second phase S2 may be slightly different. The first phase S1, the second phase S2, the third phase S3 and the fourth phase S4 included in the driving method will be described below according to the gray scale to be displayed by the sub-pixel 2 of the display substrate 100.

For example, the gray scale to be displayed by the sub-pixel 2 of the display substrate 100 is greater than or equal to a threshold gray scale. In this case, a conductive path may always be formed between the pixel driving circuit 21 and the light-emitting device 22, and correspondingly, the duration control signal may be a first enabling signal.

In a first phase S1*a*, as shown in FIG. 10, a level of a first reset signal (using the same reference character "Res_A" as the first reset signal terminal) is a low level, a level of a second reset signal (using the same reference character "Res_B" as the second reset signal terminal) is a high level, and a level of a data signal (using the same reference character "Date" as the data signal terminal) is a high level.

In response to the first reset signal received at the first reset signal terminal Res_A and the data signal, the first control sub-circuit 2121 is turned off.

A first transistor T1 in the first control sub-circuit 2121 may be turned on under control of the first reset signal, and transmit the data signal to the third node N3. Since the level of the data signal is the high level, a second transistor T2 in the first control sub-circuit 2121 may be turned off under control of the data signal from the third node N3. In this case, the second enabling signal is unable to be transmitted to the second node N2. In the same phase, a first capacitor C1 in the first control sub-circuit 2121 may store the data signal with the high level.

A third transistor T3 in the second control sub-circuit 2122 may be turned off under control of the second reset signal.

In addition, in a case where the current control circuit 211 further includes a reset sub-circuit 2115, a tenth transistor T10 and an eleventh transistor T11 in the reset sub-circuit 2115 may be turned on simultaneously under the control of the first reset signal. The tenth transistor T10 may transmit an initial signal to the sixth node N6 to reset the sixth node N6. The eleventh transistor T11 may transmit the initial signal to the light-emitting device 22 to reset the light-emitting device 22.

In a second phase S2*a*, as shown in FIG. 10, the level of the first reset signal is a high level, the level of the second reset signal is a low level, and the level of the data signal is a low level.

In response to the second reset signal received at the second reset signal terminal Res_B and the data signal, the second control sub-circuit 2122 is turned on, and transmits the first enabling signal received at the first enabling signal terminal EM to the second node N2.

A third transistor T3 in the second control sub-circuit 2122 may be turned on under the control of the second reset signal, and transmit the data signal to the fourth node N4. Since the level of the data signal is the low level, the fourth transistor T4 in the second control sub-circuit 2122 may be turned on under control of the data signal from the fourth node N4, and transmit the first enabling signal to the second node N2. In the same phase, a second capacitor C2 in the second control sub-circuit 2122 may store the data signal with the low level.

In addition, the first transistor T1 in the first control sub-circuit 2121 may be turned off under the control of the first reset signal. In this case, the first capacitor C1 discharges, so that the voltage of the third node N3 remains at the high level.

In a third phase S3*a*, as shown in FIG. 10, the level of the scanning signal (using the same reference character "Gate" as the scanning signal terminal) is a low level, the level of the data signal is the low level, the level of the first reset signal is the high level, and the level of the second reset signal is the high level.

In response to the scanning signal received at the scanning signal terminal Gate, the data writing sub-circuit 2111 and the compensation sub-circuit 2113 are turned on, and the data signal is transmit to the sixth node N6 through the fifth node N5, the driving sub-circuit 2112, the first node N1 and the compensation sub-circuit 2113 in sequence, so as to compensate a threshold voltage of the driving sub-circuit 2112.

A seventh transistor T7 in the driving sub-circuit 2112 may be turned on under control of the initial signal from the sixth node N6.

A sixth transistor T6 in the data writing sub-circuit 2111 and an eighth transistor T8 in the compensation sub-circuit 2113 may be turned on simultaneously under the control of the scanning signal. The sixth transistor T6 may receive the data signal, and transmit the data signal to the sixth node N6 through the fifth node N5, the seventh transistor T7, the first node N1 and the eighth transistor T8 in sequence. In this phase, the data signal may be continuously transmitted to the sixth node N6 until the seventh transistor T7 is turned off. In this way, the compensation for the threshold voltage of the seventh transistor T7 is completed.

In addition, the first transistor T1 in the first control sub-circuit 2121 may be turned off under the control of the first reset signal. In this case, the first capacitor C1 discharges, so that the voltage of the third node N3 remains at a high level. The third transistor T3 in the second control sub-circuit 2122 may be turned off under the control of the second reset signal. In this case, the second capacitor C2 starts to discharge, so that the voltage of the fourth node N4 remains at a low level, and the fourth transistor T4 continuously transmits the first enabling signal to the second node N2.

In a fourth phase S4*a*, as shown in FIG. 10, the level of the first enabling signal (using the same reference character "EM" as the first enabling signal terminal) is a low level, the level of the scanning signal is a high level, the level of the first reset signal is the high level, and the level of the second reset signal is the high level.

In response to the first enabling signal, the light-emitting control sub-circuit 2114 is turned on, and transmits a first voltage signal received at the first voltage signal terminal VDD to the first node N1 through the fifth node N5 and the driving sub-circuit 2112 in sequence.

A ninth transistor T9 in the light-emitting control sub-circuit 2114 is turned on under the control of the first enabling signal, so that a conductive path is formed between the fifth node N5 and the first voltage signal terminal VDD.

A fifth transistor T5 in the third control sub-circuit 2123 is turned on under the control of the first enabling signal from the second node N2, so that a conductive path is formed between the first node N1 and the light-emitting device 22.

A seventh transistor T7 in the driving sub-circuit 2112 is turned on, and transmits the first voltage signal to the first node N1. The seventh transistor T7 may generate a driving signal according to a voltage value of the data signal written to the sixth node N6 and a voltage value of the first voltage signal.

In this phase, the first node N1 and the light-emitting device 22 are connected continuously due to the first enabling signal. In this way, the driving signal may be continuously transmitted to the light-emitting device 22, so that the light-emitting device 22 may continue to emit light. A display of a high gray scale may be realized.

For example, the gray scale to be displayed by the sub-pixel 2 of the display substrate 100 is less than the threshold gray scale. In this case, the pixel driving circuit 21 and the light-emitting device 22 are in alternating connection and disconnection states, and correspondingly, the duration control signal may be the second enabling signal.

In a first phase S1*b*, as shown in FIG. 11, the level of the first reset signal (using the same reference character "Res_A" as the first reset signal terminal) is the low level, the level of the second reset signal (using the same reference character "Res_B" as the second reset signal terminal) is the high level, and the level of the data signal (using the same reference character "Data" as the data signal) is the low level.

In response to the first reset signal and the data signal, the first control sub-circuit 2121 is turned on, and transmits the second enabling signal received at the second enabling signal terminal EM to the second node N2.

The first transistor T1 in the first control sub-circuit 2121 may be turned on under the control of the first reset signal, and transmit the data signal to the third node N3. Since the level of the data signal is the low level, the second transistor T2 in the first control sub-circuit 2121 may be turned on under the control of the data signal from the third node N3, and transmit the second enabling signal to the second node N2. In the same phase, the first capacitor C1 in the first control sub-circuit 2121 may store the data signal with the low level.

The third transistor T3 in the second control sub-circuit 2122 may be turned off under the control of the second reset signal.

In addition, in a case where the current control circuit 211 further includes the reset sub-circuit 2115, the tenth transistor T10 and the eleventh transistor T11 in the reset sub-circuit 2115 may be turned on simultaneously under the control of the first reset signal. The tenth transistor T10 may transmit the initial signal to the sixth node N6 to reset the sixth node N6. The eleventh transistor T11 may transmit the initial signal to the light-emitting device 22 to reset the light-emitting device 22.

In a second phase S2*b*, as shown in FIG. 11, the level of the first reset signal is the high level, the level of the second reset signal is the low level, and the level of the data signal is the high level.

In response to the second reset signal and the data signal, the second control sub-circuit 2122 is turned off.

The third transistor T3 in the second control sub-circuit 2122 may be turned on under the control of the second reset signal, and transmit the data signal to the fourth node N4. Since the level of the data signal is the high level, the fourth transistor T4 in the second control sub-circuit 2122 may be turned off under the control of the data signal from the fourth node N4. In this case, the first enabling signal is unable to be transmitted to the second node N2. In the same phase, the second capacitor C2 in the second control sub-circuit 2122 may store the data signal with the high level.

In addition, in this phase, the first transistor T1 in the first control sub-circuit 2121 may be turned off under the control of the first reset signal. In this case, the first capacitor C1 may be discharged, so that the voltage of the third node N3 is maintained at the low level.

In a third phase S3*b*, as shown in FIG. 11, the level of the scanning signal (using the same reference character "Gate" as the scanning signal terminal) is the low level, the level of the data signal is the low level, the level of the first reset signal is the high level, and the level of the second reset signal is the high level.

In response to the scanning signal received at the scanning signal terminal Gate, the data writing sub-circuit 2111 and the compensation sub-circuit 2113 are turned on, and the data signal is transmitted to the sixth node N6 through the fifth node N5, the driving sub-circuit 2112, the first node N1 and the compensation sub-circuit 2113 in sequence, so as to compensate the threshold voltage of the driving sub-circuit 2112.

The seventh transistor T7 in the driving sub-circuit 2112 may be turned on under the control of the initial signal from the sixth node N6.

The sixth transistor T6 in the data writing sub-circuit 2111 and the eighth transistor T8 in the compensation sub-circuit 2113 may be turned on simultaneously under the control of the scanning signal. The sixth transistor T6 may receive the data signal, and transmit the data signal to the sixth node N6 through the fifth node N5, the seventh transistor T7, the first node N1 and the eighth transistor T8 in sequence. In this phase, the data signal may be continuously transmitted to the sixth node N6 until the seventh transistor T7 is turned off. In this case, the compensation for the threshold voltage of the seventh transistor T7 is completed.

In addition, the third transistor T3 in the second control sub-circuit 2122 may be turned off under the control of the second reset signal. In this case, the second capacitor C2 discharges, so that the voltage of the fourth node N4 remains at the high level. The first transistor T1 in the first control sub-circuit 2121 may be turned off under the control of the first reset signal. In this case, the first capacitor C1 starts to discharge, so that the voltage of the third node N3 remains at the low level, and the second transistor T2 continuously transmits the second enabling signal to the second node N2.

In a fourth phase S4*b*, as shown in FIG. 11, the level of the first enabling signal (using the same reference character "EM" as the first enabling signal terminal) is the low level, the second enabling signal (using the same reference character "Hf" as the second enabling signal terminal) is the high frequency pulse signal, the level of the scanning signal is the high level, the level of the first reset signal is the high level, and the level of the second reset signal is the high level.

In response to the first enabling signal, the lighting-emitting sub-circuit 2114 is turned on, and transmits the first voltage signal received at the first voltage signal terminal VDD to the first node N1 through the fifth node N5 and the driving sub-circuit 2112 in sequence.

The ninth transistor T9 in the light-emitting control sub-circuit 2114 is turned on under the control of the first enabling signal, so that a conductive path is formed between the fifth node N5 and the first voltage signal terminal VDD.

The fifth transistor T5 in the third control sub-circuit 2123 is alternately in a turn-on state and a turn-off state under the control of the second enabling signal from the second node N2, so that the first node N1 and the light-emitting device 22 are in alternating connection and disconnection states.

The seventh transistor T7 in the driving sub-circuit 2112 is turned on, and transmits the first voltage signal to the first node N1. In a phase of connecting the first node N1 and the light-emitting device 22, the seventh transistor T7 may generate a driving signal according to a voltage value of the data signal written to the sixth node N6 and a voltage value of the first voltage signal, and transmit the driving signal to the light-emitting device 22, so that the light-emitting device 22 emits light.

In this phase, since the first node N1 and the light-emitting device 22 are in the alternating connection and disconnection states, the driving signal may be intermittently transmitted to the light-emitting device 22. As a result, the light-emitting device 22 periodically receives the driving signal, and the light-emitting device 22 periodically emits light. In this way, a total light-emitting duration of the light-emitting device 22 is shortened, so that a display of the low gray scale may be realized.

It will be noted that, the data line DL of the display substrate 100 is configured to store the data signal. The scanning signal terminal Gate is configured to transmit the scanning signal after the data line DL stores the data signal in the third phase S3 (i.e., the third phase S3*a* or the third phase S3*b*), so as to control the data writing sub-circuit 2111 and the compensation sub-circuit 2113 to be turned on.

For example, the data line DL itself has parasitic capacitance. After the data signal is transmitted to the data line DL, the data signal may be stored on the parasitic capacitance of the data line DL.

For example, the scanning signal terminal Gate can transmit the scanning signal, and the scanning signal may be from a corresponding gate line GL. In the third phase S3, the level of the data signal is the low level (i.e., the active level), and the level of the scanning signal is the low level (i.e., the active level). The data signal may be restored after the data line DL receives the data signal to refresh itself; and then the scanning signal terminal Gate may transmit the scanning signal, so that the data writing sub-circuit 2111 and the compensation sub-circuit 2113 are turned on, and receive and transmit the data signal restored in the data line DL.

In this way, the data signal stored in the data line DL may be refreshed, so as to prevent residual data signal displayed in the previous frame. And then, in the display of the next frame, after the level of the scanning signal becomes the active level, the new data signal may be received, which may prevent the data signal displayed in the next frame from being unable to be normally written due to the residual data signal in the previous frame. As a result, each sub-pixel 2 may display the gray scale required to be displayed, and the display effect of the display substrate 100 may be improved.

In some embodiments, as shown in FIG. 13, the display substrate 100 further includes the multi-output selection circuit 4. Hereinafter, the driving method of the display substrate including the multi-output selection circuit 4 will be schematically described in conjunction with timing diagrams in FIGS. 14 and 15.

In the first phase S1 (i.e., the first phase S1*a* or the first phase S1*b*), selection signals ($Mux_1$ to $Mux_6$) transmitted by a plurality of selection signal lines Mux are transmitted to the multi-output selection circuit 4. Each selection transistor group 41 in the multi-output selection circuit 4 is turned on under control of a corresponding selection signal. Data signals from the data transmission lines DTL are transmitted to corresponding data lines DL by the selection transistor groups 41 in different periods, and stored on parasitic capacitances of the corresponding data lines DL.

Since there is a time interval between active levels (i.e., low levels) of selection signals transmitted by any two adjacent selection signal lines Mux, there is a time interval between turn-on times of any two adjacent transistor groups 41. In this way, the data signals from the data transmission lines DTL may be transmitted to the corresponding data lines DL in the different periods.

In this phase, the duration of the low level of the first reset signal may be set depending on actual needs.

Figure 14:
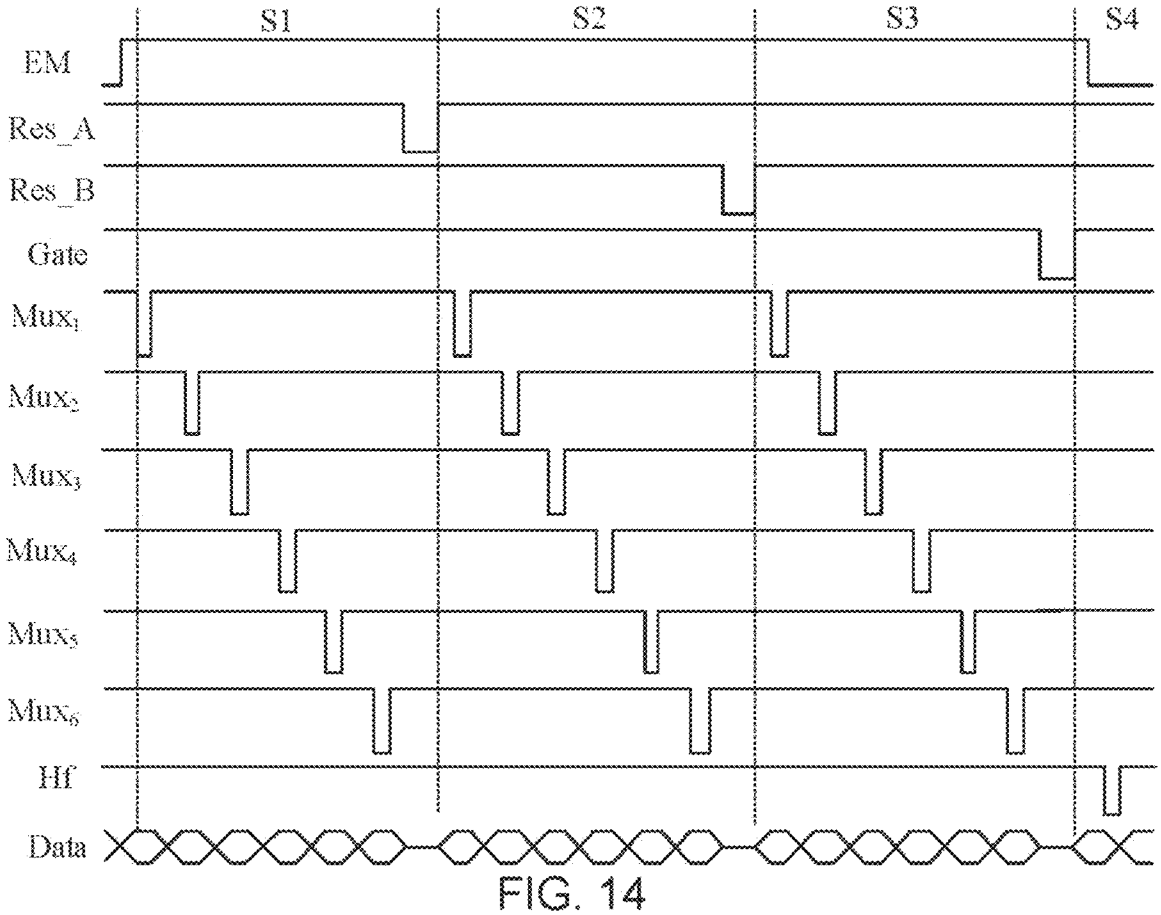
FIG. 14 is a timing diagram corresponding to the display substrate shown in FIG. 13, in accordance with some embodiments of the present disclosure.

For example, as shown in FIG. 14, after the multi-output selection circuit 4 transmits the data signals to the corresponding data lines DL in the different periods, the level of the first reset signal becomes the low level. Before the completion of the writing of the data signal and the second phase S2, the level of the first reset signal becomes the high level.

Figure 15:
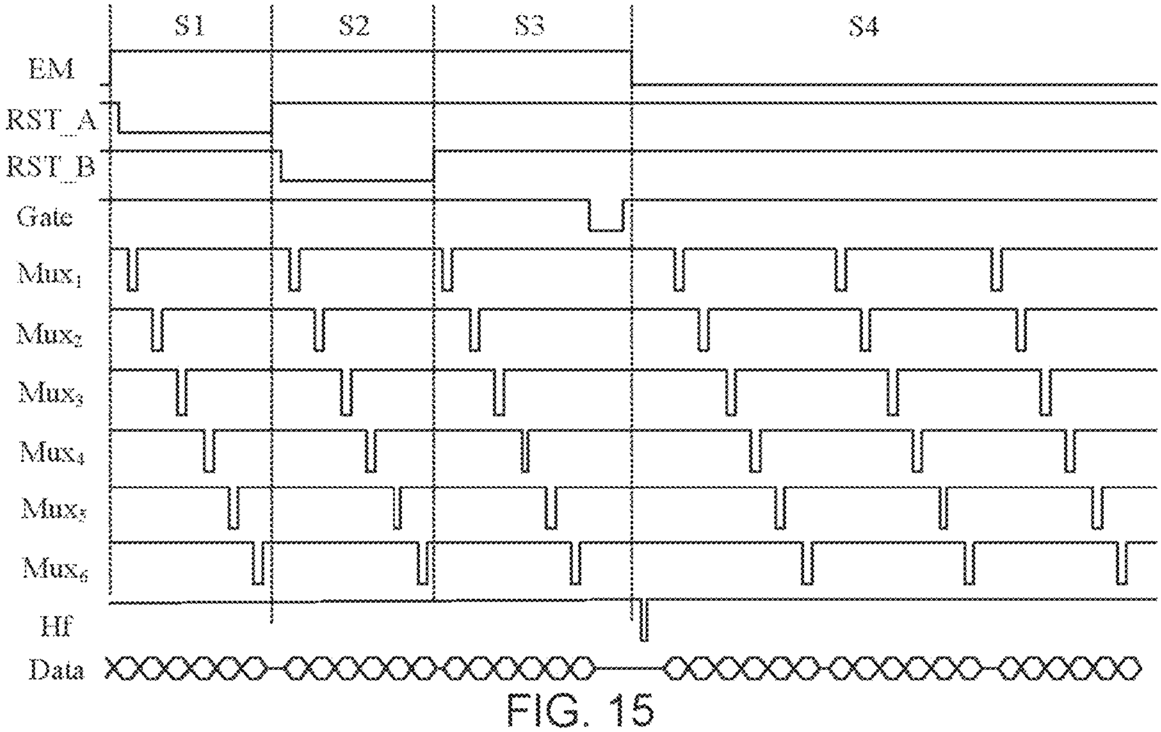
FIG. 15 is another timing diagram corresponding to the display substrate shown in FIG. 13, in accordance with some embodiments of the present disclosure.

For another example, as shown in FIG. 15, the multi-output selection circuit 4 transmits the data signals to the corresponding data lines DL in the different periods, and within these periods, the level of the first reset signal becomes the low level. Before the completion of the writing of the data signal and the second phase S2, the level of the first reset signal becomes the high level. In this way, the duration of the low level of the first reset signal may be increased, which is conducive to increasing the duration of writing the data signal.

The transmission process of the data signal in the second phase S2 (i.e., the second phase S2*a* or the second phase S2*b*) is the same as the transmission process of the data signal in the first phase S1, and a setting manner of a duration of the low level of the second reset signal may be the same as a setting manner of the duration of the low level of the first reset signal, which will not be repeated here.

It will be mentioned that in a case where the durations of the first reset signal and the second reset signal increase, frequencies of the first reset signal, the second reset signal and the data signal will be inconsistent. In this case, the driving chip 200 may be adjusted, so that the driving chip 200 is compatible.

In the third phase S3 (i.e., the third phase S3*a* or the third phase S3*b*), before the level of the scanning signal becomes the low level, the multi-output selection circuit 4 completes the writing and storing of the data signals in the different periods.

It will be understood that, in a case where the duration of the display of a single frame is a fixed value, durations of the first phase S1, the second phase S2 and the third phase S3 may also each be a fixed value. In this case, on the premise of ensuring that the multi-output selection circuit 4 can transmit the data signals to the corresponding data lines DL in the different periods, the duration of the low level (i.e., the active level) of each selection signal may be reduced in embodiments of the present disclosure. In this way, it is conducive to increasing the durations of the low levels of the first reset signal, the second reset signal and the scanning signal, and then providing a sufficient time for writing the data signal and compensating the seventh transistor T7.

In some other embodiments, as shown in FIG. 17, a same data line DL is electrically connected to at least two columns of sub-pixels, and a row of sub-pixels is electrically connected to at least two gate lines GL. With reference to the timing diagram shown in FIG. 18, the driving method of the display substrate will be schematically described by taking an example in which a same data line DL is electrically connected to six columns of sub-pixels, and a row of sub-pixels is electrically connected to six gate lines ($GL_1$ to $GL_6$).

It will be understood that, as shown in FIG. 17, in these embodiments, the number of first reset signal lines RL1 electrically connected to the first reset signal terminal Res_A of the same row of sub-pixels is also six ($RL1_1$ to $RL1_6$), and the number of second reset signal lines RL2 electrically connected to the second reset signal terminal Res_B of the same row of sub-pixels is also six ($RL2_1$ to $RL2_6$). A connection relationship between the first reset signal line RL1 or the second reset signal line RL2 and the same row of sub-pixels may be the same as the connection relationship between the gate line GL and the same row of sub-pixels.

In the first phase S1 (i.e., the first phase S1*a* or the first phase S1*b*), the six first reset signal lines ($RL1_1$ to $RL1_6$) transmit first reset signals ($Res\_A_1$ to $Res\_A_6$) to first reset signal terminals Res_A of corresponding sub-pixels 2, respectively. Active level periods of the first reset signals do not coincide, which is conducive to writing the data signal of the same data line DL to different sub-pixels 2 in the different periods.

There is a time interval between active levels (i.e., low levels) of first reset signals transmitted by any two adjacent first reset signal lines RL1. In this way, before the level of each first reset signal becomes the active level, refreshing and storing of the data signal of each data line DL may be completed by using the time interval.

In the second phase S2 (i.e., the second phase S2*a* or the second phase S2*b*), the six second reset signal lines ($RL2_1$ to $RL2_6$) transmit second reset signals ($Res\_B_1$ to $Res\_B_6$) to second reset signal terminals Res_B of the corresponding sub-pixels 2, respectively. Active level periods of the second reset signals do not coincide, which is conducive to writing the data signal of the same data line DL to different sub-pixels 2 in the different periods.

There is a time interval between active levels (i.e., low levels) of second reset signals transmitted by any two adjacent second reset signal lines RL2. In this way, before the level of each second reset signal becomes the active level, refreshing and storing of the data signal of each data line DL may be completed by using the time interval.

In the third phase S3 (i.e., the third phase S3*a* or the third phase S3*b*), the six gate lines GL transmit scanning signals ($Gate_1$ to $Gate_6$) to scanning signal terminals Gate of the corresponding sub-pixels, respectively. Active level periods of the scanning signals do not coincide, which is conducive to writing the data signal of the same data line DL to different sub-pixels 2 in the different periods.

There is a time interval between active levels of scanning signals transmitted by any two adjacent first gate lines GL. In this way, before the level of each scanning signal becomes the active level, refreshing and storing of the data signal of each data line DL may be completed by using the time interval.

In some embodiments, the active level (i.e., the low level) period of the second enabling signal is all in the fourth phase S4. That is, a period in which the level of the second enabling signal changes from the high level to the low level is all in the fourth phase S4. In the first phase S1, the second phase S2 and the third phase S3, the level of the second enabling signal may, for example, remain at an inactive level (i.e., the high level).

In this way, in the third phase S3, in the process of compensating the threshold voltage of the seventh transistor T7, it is possible to avoid coupling interference of the data signal written to the control electrode of the seventh transistor T7 caused by the high frequency second enabling signal being pull-downed, and avoid a change in a voltage of the control electrode of the seventh transistor T7, which is conducive to ensuring that the sub-pixel 2 may normally display the gray scale. In addition, by setting the active level period of the second enabling signal in the fourth phase S4, it is also possible to avoid arranging an anti-interference transistor between the fifth transistor T5 and the first node N1, which is conducive to simplifying the structure of the sub-pixel 2 and improving yields of the sub-pixel 2 and the display substrate 100.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A display substrate, comprising:

a plurality of data lines extending in a first direction; and a plurality of sub-pixels, a sub-pixel including a pixel driving circuit and a light-emitting device;

wherein the pixel driving circuit includes: a current control circuit, and a duration control circuit electrically connected to the current control circuit and the light-emitting device; the current control circuit is configured to generate a driving signal to drive the light-emitting device to emit light; and the duration control circuit is configured to generate a duration control signal to control a duration of a connection between the current control circuit and the light-emitting device; and the current control circuit and the duration control circuit are electrically connected to a same data line;

the current control circuit is at least electrically connected to a scanning signal terminal, a data signal terminal, a first enabling signal terminal, a first voltage signal terminal and a first node; the current control circuit is configured to generate the driving signal in response to a scanning signal received at the scanning signal terminal, a data signal received at the data signal terminal, a first enabling signal received at the first enabling signal terminal, and a first voltage signal received at the first voltage signal terminal; and the duration control circuit is at least electrically connected to the data signal terminal, a first reset signal terminal, a second reset signal terminal, the first enabling signal terminal, a second enabling signal terminal, the first node and the light-emitting device; the duration control circuit is configured to, in response to the data signal and a first reset signal received at the first reset signal terminal, control a duration of a connection between the first node and the light-emitting device according to a second enabling signal received at the second enabling signal terminal; or in response to the data signal and the second reset signal received at the second reset signal terminal, to control a duration of a connection between the first node and the light-emitting device according to the first enabling signal; and the display substrate further comprising:

a multi-output selection circuit electrically connected to the plurality of data lines;

a plurality of data transmission lines electrically connected to the multi-output selection circuit; and a plurality of selection signal lines electrically connected to the multi-output selection circuit;

wherein the multi-output selection circuit is configured to, under control of selection signals transmitted by the plurality of selection signal lines, transmit data signals transmitted by the plurality of data transmission lines to the plurality of data lines in different periods.

2. The display substrate according to claim 1, wherein the plurality of sub-pixels are arranged in a plurality of columns in a second direction, the second direction intersecting the first direction; and the same data line is electrically connected to at least one column of sub-pixels.

3. The display substrate according to claim 2, wherein one or more columns of sub-pixels is disposed between any two adjacent data lines.

4. The display substrate according to claim 1, wherein the plurality of data lines at least include: a plurality of first data lines, a plurality of second data lines and a plurality of third data lines;

the plurality of data transmission lines at least include: a plurality of first data transmission lines, a plurality of second data transmission lines and a plurality of third data transmission lines; and the multi-output selection circuit includes: a plurality of selection transistor groups; and a selection transistor group is electrically connected to a selection signal line, a first data line, a second data line and a third data line;

wherein a first data transmission line is electrically connected to at least two selection transistor groups, and electrically connected to corresponding multiple first data lines through the at least two selection transistor groups;

a second data transmission line is electrically connected to the at least two selection transistor groups, and electrically connected to corresponding multiple second data lines through the at least two selection transistor groups; and a third data transmission line is electrically connected to the at least two selection transistor groups, and electrically connected to corresponding multiple third data lines through the at least two selection transistor groups.

5. The display substrate according to claim 4, wherein the plurality of first data transmission lines, the plurality of second data transmission lines and the plurality of third data transmission lines are arranged periodically; and/or the plurality of first data lines, the plurality of second data lines and the plurality of third data lines are arranged periodically.

6. The display substrate according to claim 4, wherein the selection transistor group at least includes: a first selection transistor, a second selection transistor and a third selection transistor, wherein a control electrode of the first selection transistor is electrically connected to the selection signal line, a first electrode of the first selection transistor is electrically connected to the first data transmission line, and a second electrode of the first selection transistor is electrically connected to the first data line;

a control electrode of the second selection transistor is electrically connected to the selection signal line, a first electrode of the second selection transistor is electrically connected to the second data transmission line, and a second electrode of the second selection transistor is electrically connected to the second data line; and a control electrode of the third selection transistor is electrically connected to the selection signal line, a first electrode of the third selection transistor is electrically connected to the third data transmission line, and a second electrode of the third selection transistor is electrically connected to the third data line.

7. The display substrate according to claim 2, wherein the same data line is electrically connected to at least two columns of sub-pixels;

the display substrate further comprises a plurality of gate lines extending in the second direction; and a sub-pixel is electrically connected to a gate line;

the plurality of sub-pixels are arranged in a plurality of rows in the first direction; and a row of sub-pixels is electrically connected to at least two gate lines; and the at least two gate lines are configured to transmit scanning signals to corresponding sub-pixels, respectively, so as to control the row of sub-pixels to receive data signals transmitted by the plurality of data lines in different periods.

8. The display substrate according to claim 7, wherein a number of the columns of the sub-pixels electrically connected to the same data line is equal to a number of gate lines electrically connected to a same row of sub-pixels.

9. The display substrate according to claim 7, wherein the at least two gate lines are disposed on opposite sides of the row of sub-pixels, respectively.

10. The display substrate according to claim 7, wherein in a same row of sub-pixels, any two adjacent sub-pixels are electrically connected to different gate lines, respectively.

11. The display substrate according to claim 1, further comprising:

a substrate, the plurality of data lines and the plurality of sub-pixels being disposed on one side of the substrate; and a plurality of connection wires disposed on an edge of the substrate, one end of a connection wire being electrically connected to at least one data line, and another end of the connection wire extending to another side of the substrate, wherein the one end of the connection wire is electrically connected to a data transmission line, and electrically connected to multiple data lines through the multi-output selection circuit.

12. The display substrate according to claim 1, wherein the current control circuit and the duration control circuit are electrically connected to the data line through the same data signal terminal.

13. The display substrate according to claim 12, wherein a period of an active level of the first reset signal is in non-coincidence with a period of an active level of the second reset signal; and of the data signal, one of a level corresponding to an active level of the first reset signal, and a level corresponding to an active level of the second reset signal is an active level; and/or in a phase of generating the driving signal, a period in which a level of the data signal becomes an active level is earlier than a period in which a level of the scanning signal becomes an active level.

14. The display substrate according to claim 12, wherein the duration control circuit includes:

a first control sub-circuit, the first control sub-circuit being at least electrically connected to the data signal terminal, the first reset signal terminal, the second enabling signal terminal and a second node, and being configured to transmit the second enabling signal to the second node in response to the data signal and the first reset signal;

a second control sub-circuit, the second control sub-circuit being at least electrically connected to the data signal terminal, the second reset signal terminal, the first enabling signal terminal and the second node, and being configured to transmit the first enabling signal to the second node in response to the data signal and the second reset signal; and a third control sub-circuit, the third control sub-circuit being electrically connected to the first node, the second node and the light-emitting device, and being configured to control the duration of the connection between the first node and the light-emitting device under control of a signal from the second node.

15. The display substrate according to claim 12, wherein the current control circuit includes:

a data writing sub-circuit, the data writing sub-circuit being electrically connected to the scanning signal terminal, the data signal terminal and a fifth node, and being configured to transmit the data signal to the fifth node under control of the scanning signal;

a driving sub-circuit, the driving sub-circuit being at least electrically connected to the first node, the fifth node and a sixth node, and being configured to transmit a signal from the fifth node to the first node under control of a voltage of the sixth node;

a compensation sub-circuit, the compensation sub-circuit being electrically connected to the scanning signal terminal, the first node and the sixth node, and being configured to transmit a signal from the first node to the sixth node under the control of the scanning signal to compensate a threshold voltage of the driving sub-circuit; and a light-emitting control sub-circuit, the light-emitting control sub-circuit being electrically connected to the first enabling signal terminal, the first voltage signal terminal, and the fifth node, and being configured to transmit the first voltage signal to the fifth node under control of the first enabling signal.

16. A driving method of a display substrate, for driving the display substrate according to claim 1, the driving method comprising:

transmitting data signals to the plurality of data lines of the display substrate through the multi-output selection circuit, and receiving, by a current control circuit and a duration control circuit in a same sub-pixel, a data signal;

wherein the current control circuit includes: a data writing sub-circuit, a driving sub-circuit, a compensation sub-circuit and a light-emitting control sub-circuit, and the duration control circuit includes: a first control sub-circuit, a second control sub-circuit and a third control sub-circuit;

a display phase of a frame includes: a first phase, a second phase, a third phase and a fourth phase;

in a case where a gray scale to be displayed by the sub-pixel of the display substrate is greater than or equal to a threshold gray scale, the driving method further comprises:

in the first phase, turning off the first control sub-circuit in response to a first reset signal received at a first reset signal terminal and the data signal; and in the second phase, turning on the second control sub-circuit in response to a second reset signal received at a second reset signal terminal and the data signal, and transmitting a first enabling signal received at a first enabling signal terminal to a second node;

in a case where the gray scale to be displayed by the sub-pixel of the display substrate is less than the threshold gray scale, the driving method further comprises:

in the first phase, turning on the first control sub-circuit in response to the first reset signal and the data signal, and transmitting, by the first control sub-circuit, a second enabling signal received at a second enabling signal terminal to the second node;

in the second phase, turning off the second control sub-circuit in response to the second reset signal and the data signal;

in the third phase, turning on the data writing sub-circuit and the compensation sub-circuit in response to a scanning signal received at a scanning signal terminal, and transmitting, by the data writing sub-circuit, the data signal to a sixth node through a fifth node, the driving sub-circuit, a first node and the compensation sub-circuit in sequence to compensate a threshold voltage of the driving sub-circuit; and in the fourth phase, turning on the light-emitting control sub-circuit in response to the first enabling signal, and transmitting, by the light-emitting control sub-circuit, a first voltage signal received at the first voltage signal terminal to the first node through the fifth node and the driving sub-circuit in sequence.

17. The driving method according to claim 16, wherein the data line is configured to store the data signal;

the scanning signal terminal is configured to transmit the scanning signal after the data line stores the data signal in the third phase, so as to control the data writing sub-circuit and the compensation sub-circuit to be turned on.

18. A display apparatus, comprising: at least one display substrate each according to claim 1.

19. The display apparatus according to claim 18, wherein the display substrate includes: a substrate and a plurality of connection wires disposed on an edge of the substrate;

ends of the plurality of connection wires are located at one side of the substrate, and opposite ends of the plurality of connection wires extend to another side of the substrate;

the display apparatus further comprises: a driving chip disposed on the another side of the substrate, wherein the driving chip is electrically connected to the opposite ends of the plurality of connection wires.

* * * * *